US012682359B2

(12) United States Patent
Paulraj et al.

(10) Patent No.: US 12,682,359 B2
(45) Date of Patent: Jul. 14, 2026

(54) REVERSIBLE VALIDATION OF MODIFICATIONS TO AN IHS

(71) Applicant: Dell Products, L.P., Round Rock, TX (US)

(72) Inventors: Deepaganesh Paulraj, Bangalore (IN); Nishaa Bouvanasilan, Bangalore (IN); Kalyani Korubilli, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 208 days.

(21) Appl. No.: 18/472,323

(22) Filed: Sep. 22, 2023

(65) Prior Publication Data

US 2025/0104092 A1     Mar. 27, 2025

(51) Int. Cl.
*G06Q 30/018*          (2023.01)

(52) U.S. Cl.
CPC .................................. *G06Q 30/018* (2013.01)

(58) Field of Classification Search
CPC .... G06Q 10/087; G06Q 10/08; G06Q 30/014; G06Q 30/018; G06Q 30/012; G60Q 30/012

See application file for complete search history.

(56) References Cited

U.S. PATENT DOCUMENTS

| | | | | |
|---|---|---|---|---|
| 10,177,914 B1 * | 1/2019 | Lee | ......................... | H04L 63/02 |
| 2005/0203789 A1 * | 9/2005 | Kauffman | .............. | G06Q 10/00 705/80 |

| | | | | |
|---|---|---|---|---|
| 2019/0097812 A1 * | 3/2019 | Toth | ...................... | H04L 9/0841 |
| 2020/0125068 A1 * | 4/2020 | Trounson, III | .. | G05B 19/40938 |
| 2021/0021432 A1 * | 1/2021 | Atkins | ...................... | H04L 9/50 |
| 2022/0207185 A1 * | 6/2022 | Young | ................... | H04L 9/3247 |
| 2022/0229915 A1 * | 7/2022 | Sethi | ...................... | G06F 21/40 |

OTHER PUBLICATIONS

Amato, Paolo; "Mobile Systems Secure State Management"; 2022 25th Euromicro Conference on Digital System Design (DSD), Maspalomas, Spain, 2022, pp. 564-571; https://ieeexplore.ieee.org/stamp/stamp.jsp?tp=&arnumber=9996859 (Year: 2022).*

* cited by examiner

*Primary Examiner* — Shannon S Campbell
*Assistant Examiner* — David G. Godbold
(74) *Attorney, Agent, or Firm* — Fogarty LLP

(57) ABSTRACT

Systems and methods are provided for secure and reversible modifications to hardware components of IHSs (Information Handling Systems). During factory provisioning of the IHS, a factory-signed inventory certificate is uploaded to the IHS that identifies factory-installed hardware of the IHS. Factory provisioning also generates an ownership voucher for the customer for which the IHS has been manufactured. The ownership voucher identifies an administrator that will receive the IHS in order to modify it for a particular deployment of the IHS by the customer. Upon receipt of the IHS by the administrator, validation procedures use the inventory certificate to validate the detected IHS hardware as factory-installed. The administrator makes modifications to the IHS and accesses the ownership voucher to assert ownership of the IHS. Based on the voucher, a delta certificate is created for use in validating and reversing the modifications by the administrator.

20 Claims, 11 Drawing Sheets

200

300

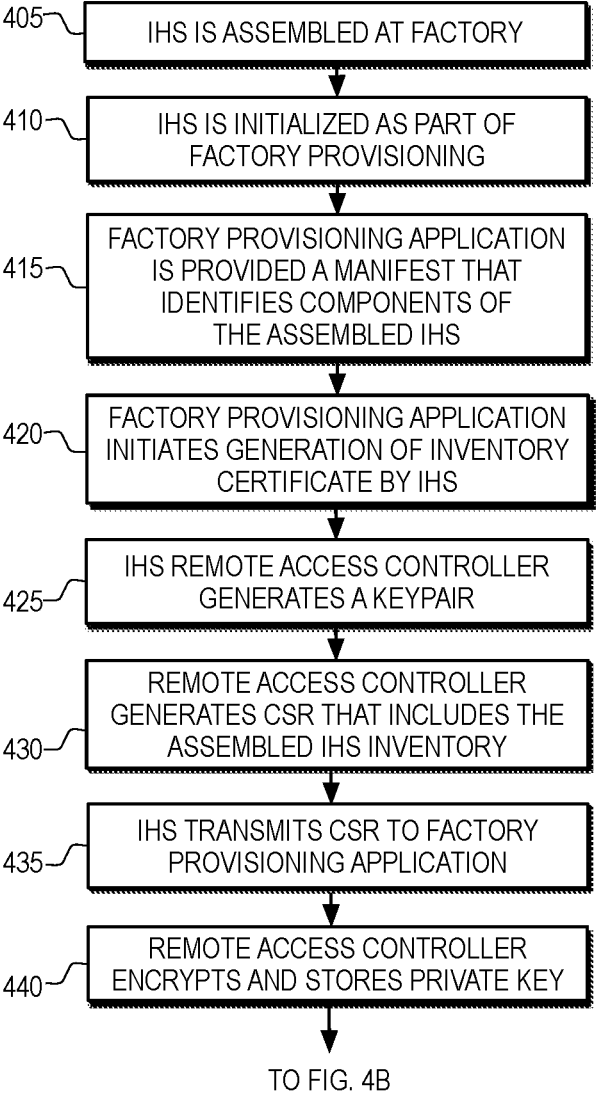

405 — IHS IS ASSEMBLED AT FACTORY

410 — IHS IS INITIALIZED AS PART OF FACTORY PROVISIONING

415 — FACTORY PROVISIONING APPLICATION IS PROVIDED A MANIFEST THAT IDENTIFIES COMPONENTS OF THE ASSEMBLED IHS

420 — FACTORY PROVISIONING APPLICATION INITIATES GENERATION OF INVENTORY CERTIFICATE BY IHS

425 — IHS REMOTE ACCESS CONTROLLER GENERATES A KEYPAIR

430 — REMOTE ACCESS CONTROLLER GENERATES CSR THAT INCLUDES THE ASSEMBLED IHS INVENTORY

435 — IHS TRANSMITS CSR TO FACTORY PROVISIONING APPLICATION

440 — REMOTE ACCESS CONTROLLER ENCRYPTS AND STORES PRIVATE KEY

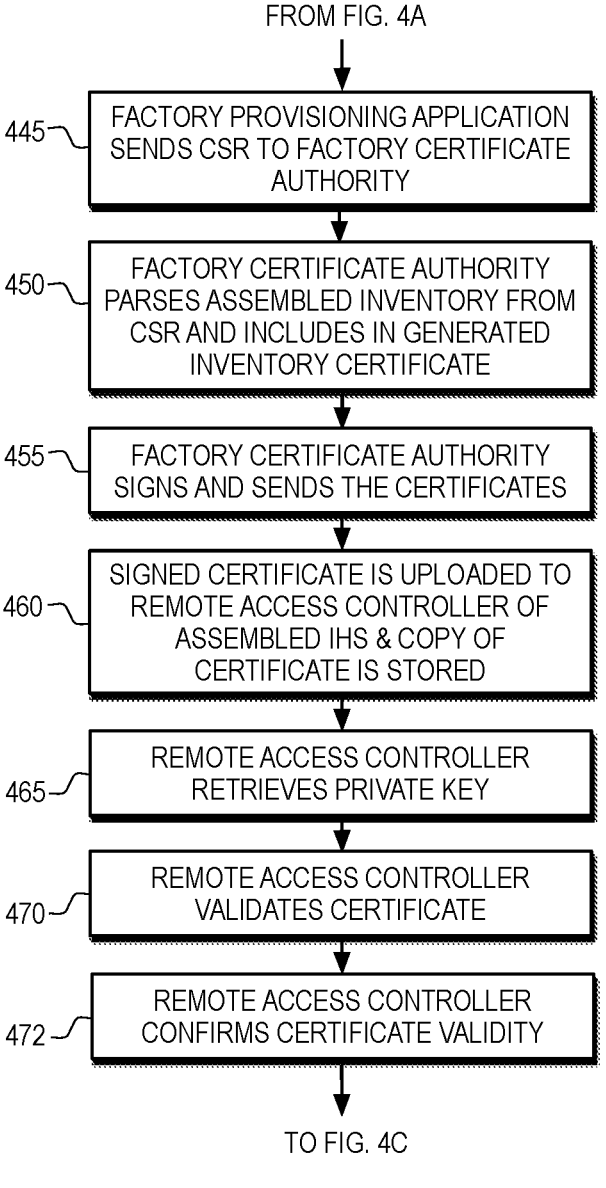

FROM FIG. 4A

445 — FACTORY PROVISIONING APPLICATION SENDS CSR TO FACTORY CERTIFICATE AUTHORITY

450 — FACTORY CERTIFICATE AUTHORITY PARSES ASSEMBLED INVENTORY FROM CSR AND INCLUDES IN GENERATED INVENTORY CERTIFICATE

455 — FACTORY CERTIFICATE AUTHORITY SIGNS AND SENDS THE CERTIFICATES

460 — SIGNED CERTIFICATE IS UPLOADED TO REMOTE ACCESS CONTROLLER OF ASSEMBLED IHS & COPY OF CERTIFICATE IS STORED

465 — REMOTE ACCESS CONTROLLER RETRIEVES PRIVATE KEY

470 — REMOTE ACCESS CONTROLLER VALIDATES CERTIFICATE

472 — REMOTE ACCESS CONTROLLER CONFIRMS CERTIFICATE VALIDITY

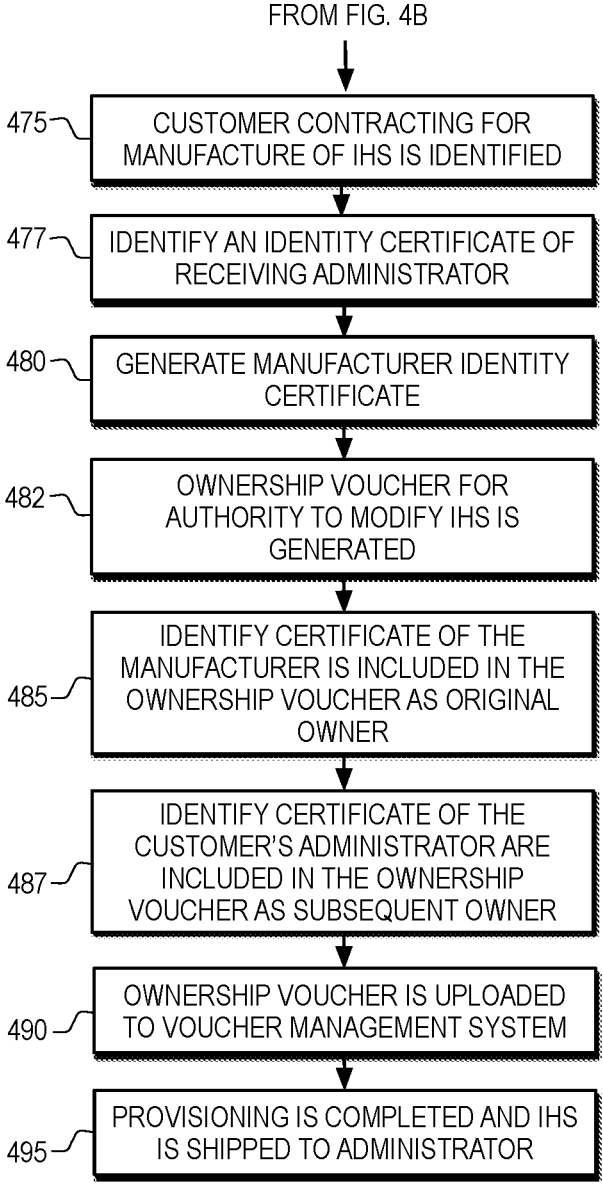

FROM FIG. 4B

475 — CUSTOMER CONTRACTING FOR MANUFACTURE OF IHS IS IDENTIFIED

477 — IDENTIFY AN IDENTITY CERTIFICATE OF RECEIVING ADMINISTRATOR

480 — GENERATE MANUFACTURER IDENTITY CERTIFICATE

482 — OWNERSHIP VOUCHER FOR AUTHORITY TO MODIFY IHS IS GENERATED

485 — IDENTIFY CERTIFICATE OF THE MANUFACTURER IS INCLUDED IN THE OWNERSHIP VOUCHER AS ORIGINAL OWNER

487 — IDENTIFY CERTIFICATE OF THE CUSTOMER'S ADMINISTRATOR ARE INCLUDED IN THE OWNERSHIP VOUCHER AS SUBSEQUENT OWNER

490 — OWNERSHIP VOUCHER IS UPLOADED TO VOUCHER MANAGEMENT SYSTEM

495 — PROVISIONING IS COMPLETED AND IHS IS SHIPPED TO ADMINISTRATOR

REVERSIBLE VALIDATION OF MODIFICATIONS TO AN IHS

FIELD

The present disclosure relates generally to Information Handling Systems (IHSs), and relates more particularly to supporting secure modifications to IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise-class servers that are stacked and installed within racks. A data center may include large numbers of such racks that may be organized into rows, where the servers installed in each rack may be outwardly very similar looking, such that it may be difficult for administrators to effectively keep track of the configurations and capabilities of any individual server in the data center. Moreover, administration of such large groups of servers may require teams of remote and local administrators working in shifts in order to support around-the-clock availability of the data center operations, while also minimizing any downtime. Each server IHS within a data center may support a wide variety of possible hardware and software configurations. For instance, each individual server IHS may be manufactured accordingly to customized hardware and software configurations requested by a customer. Once an IHS has been received and deployed, a customer may make modifications to the hardware and software of the IHS in order to adapt it for a particular computing task or a particular physical environment. In some instances, these adaptation may be reversed in order to revert an IHS to a prior configuration.

SUMMARY

In various embodiments, methods and systems provide validation of secure and reversible modifications to hardware components IHSs (Information Handling Systems). In embodiments, a validation process of an IHS is configured to: retrieve a factory-provisioned inventory certificate that specifies factory-installed hardware of the IHS; retrieve, from a remote voucher management system, an ownership voucher of the IHS that specifies an identity of a first administrator designated as prior owner of the IHS and an identity of a second administrator designated as owner of the IHS, and wherein the ownership voucher is uploaded to the remote voucher system as part of factory provisioning of the IHS; based on presentation of the retrieved ownership voucher of the IHS by the second administrator, obtain a delta certificate that specifies a hardware modification by the second administrator to the factory-installed hardware specified in the inventory certificate; and update the ownership voucher stored by the remote voucher system upon a transfer of the IHS to a third administrator, wherein the updated ownership voucher specifies the identity of the third administrator as the owner of the IHS and the identity of the second entity as the prior owner of the IHS.

In some embodiments, an administrator designated as the owner of the IHS in the ownership voucher is authorized to modify hardware of the IHS. In some embodiments, the validation process is configured to block generation of delta certificates without retrieval of the ownership voucher from the remote voucher management system. In some embodiments, the validation process blocks generation of delta certificates without the second administrator confirmed as the owner of the IHS based on an identity certificate used as the identity of the owner in the ownership voucher. In some embodiments, the factory-provisioned inventory certificate is stored to a persistent memory of the IHS during the factory-provisioning of the IHS. In some embodiments, the validation process is further configure to: collect an inventory of detected hardware of the IHS; validate the detected hardware of the IHS as factory-installed based on an inventory specified in the factory-provisioned inventory certificate. In some embodiments, the delta certificate is obtained from a remote access controller of the IHS based on presentation of the retrieved ownership voucher. In some embodiments, the remote voucher system comprises a FIDO (Fast IDentity Online) ownership tracking system. In some embodiments, the ownership voucher of the IHS further comprises a digital signature of the factory-provisioned inventory certificate of the IHS. In some embodiments, the ownership voucher of the IHS further comprises a digital signature of the delta certificate of the IHS that specifies a hardware modification by the second administrator.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIG. 4A is a flowchart describing certain steps of a method, according to some embodiments, for assembly and provisioning of an IHS in a manner that supports secure and reversible modifications to hardware components the IHS.

FIG. 4B is a flowchart that is a continuation of FIG. 4A.

FIG. 4C is a flowchart that is a continuation of FIGS. 4A and 4B.

DETAILED DESCRIPTION

Figure 1:
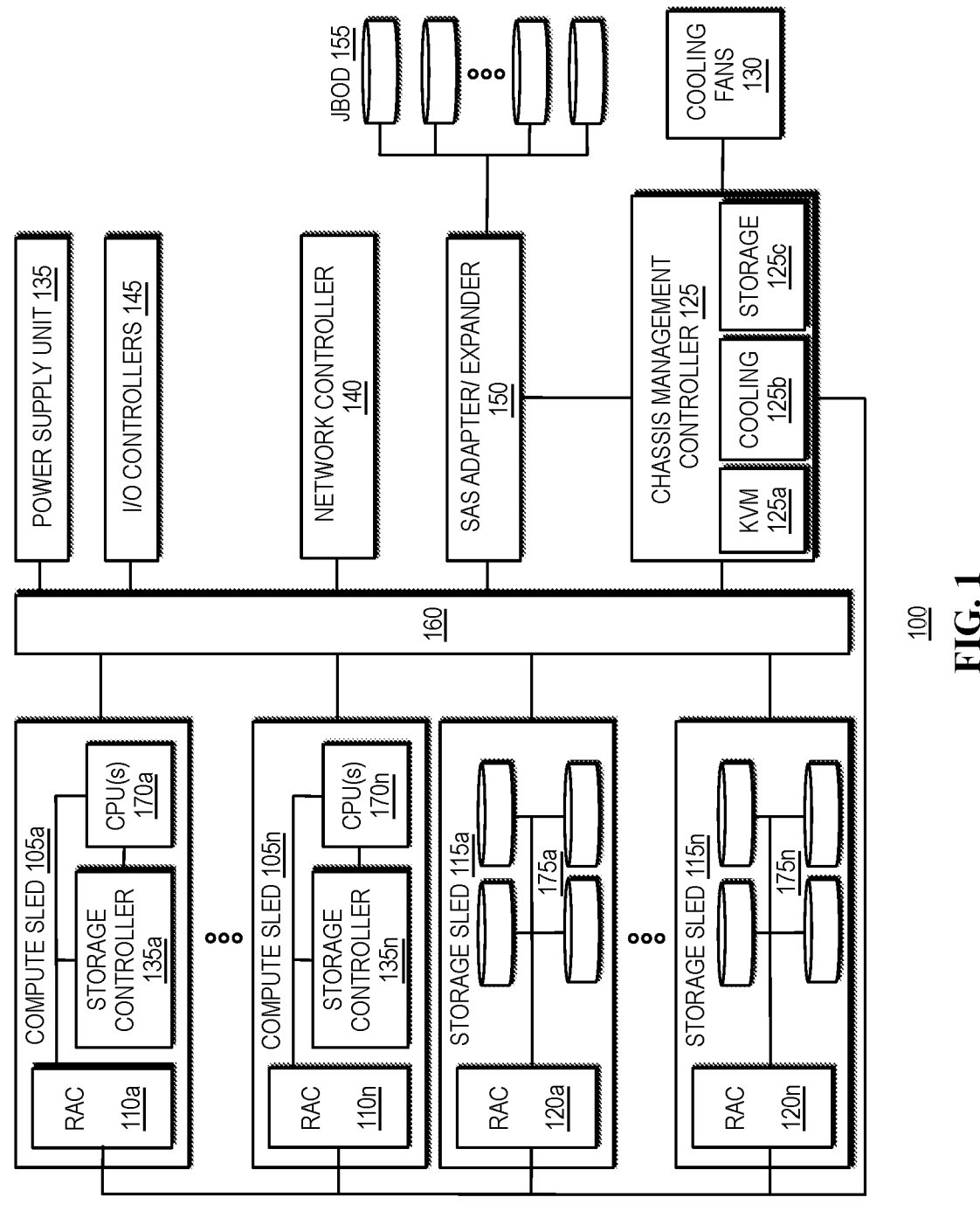
FIG. 1 is a diagram illustrating certain components of a chassis, according to some embodiments, for supporting secure and reversible modifications to hardware components of the chassis.

FIG. 1 is a block diagram illustrating certain components of a chassis 100 comprising one or more compute sleds 105a-n and one or more storage sleds 115a-n that may be configured to implement the systems and methods described herein for supporting secure and reversible modifications to hardware components of the chassis 100. Embodiments of chassis 100 may include a wide variety of different hardware configurations. Such variations in hardware configuration may result from chassis 100 being factory assembled to include components specified by a customer that has contracted for manufacture and delivery of chassis 100. Upon delivery of an chassis 100, the chassis and/or individual IHS sleds installed in the chassis 100, may be modified by replacing various hardware components or by installing new hardware components.

As described in additional detail below, chassis 100 may include capabilities that allow a customer to validate that hardware detected in chassis 100 is the same factory installed and provisioned hardware that was supplied to the customer. In addition, embodiments support secure modifications to chassis 100, such as by an designated administrator that receives the IHS from the manufacturer and may perform hardware customizations to support the requirements of a specific deployment. In some instances, ownership or control of the chassis 100 may change over time such that the chassis 100 is provided to another administrator that performs additional hardware customizations. Embodiments supports secure modifications to a chassis 100 in such scenarios and further supports secure reversal of these modifications through the use of an ownership voucher that is created for the chassis 100, or for individual IHS sleds (e.g., compute sleds 105a-n and storage sleds 115a-n), and used to track the ownership and modification history of these components.

Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135. In some embodiments, a backplane 160 may be uniquely identified based on a code or other identifier that may be permanently encoded in a non-volatile memory of the backplane 160 by its manufacturer. As described below, embodiments may support validation of backplane 160 as being the same backplane that was installed at the factory during the manufacture of chassis 100. Embodiments may further support secure validation of the replacement of backplane 160, and also supports any subsequent reversal of this replacement.

Figure 2:
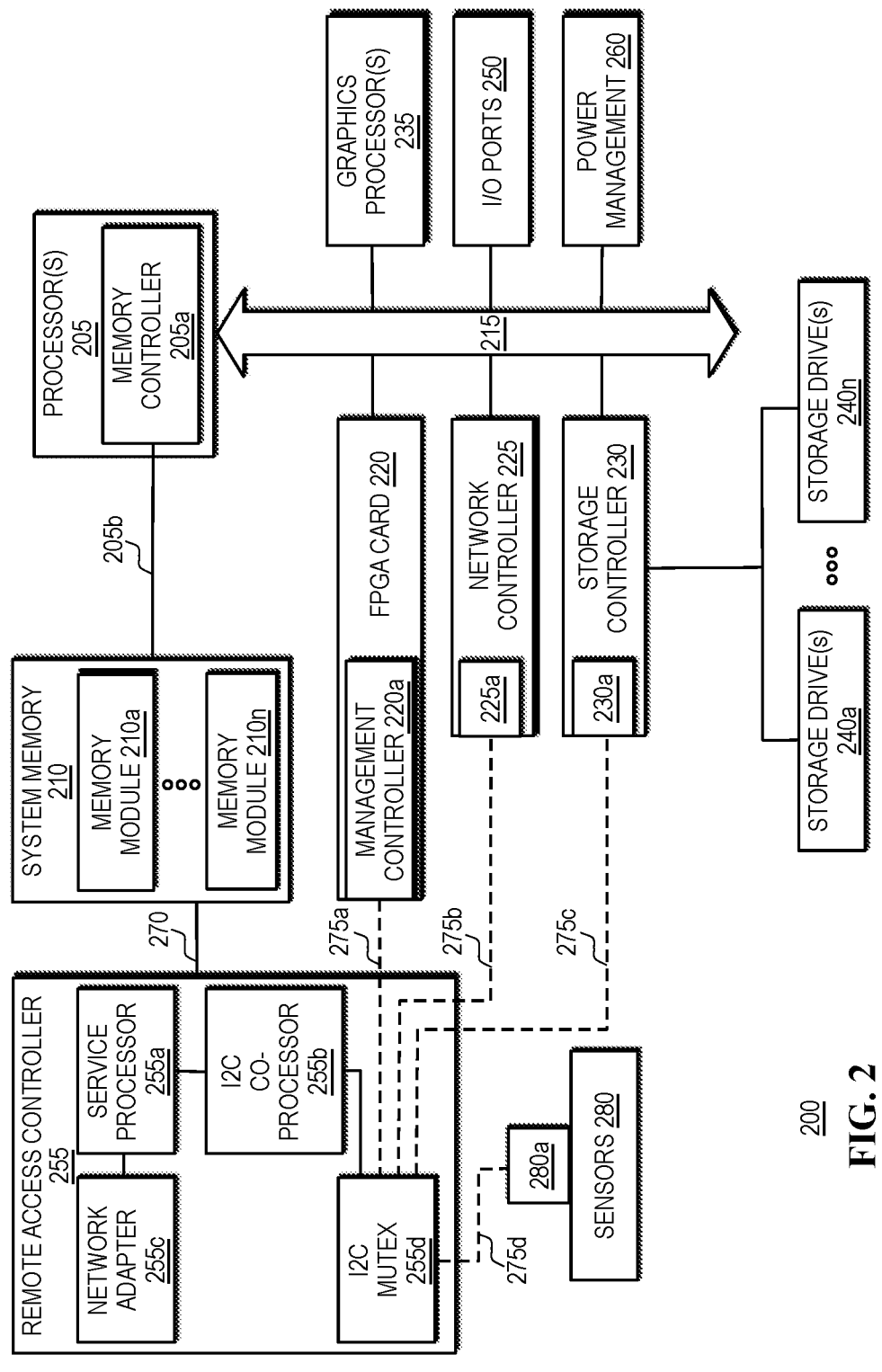
FIG. 2 is a diagram illustrating certain components of an IHS configured, according to some embodiments, for secure and reversible modifications to hardware components the IHS.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105*a-n* includes a remote access controller (RAC) 110*a-n*. As described in additional detail with regard to FIG. 2, remote access controller 110*a-n* provides capabilities for remote monitoring and management of compute sled 105*a-n*. In support of these monitoring and management functions, remote access controllers 110*a-n* may utilize both in-band and sideband (i.e., out-of-band) communications with various components of a compute sled 105*a-n* and chassis 100. Remote access controllers 110*a-n* may collect various types of sensor data, such as collecting temperature sensor readings that are used in support of airflow cooling of the chassis 100 and the sleds 105*a-n*, 115*a-n*. In addition, each remote access controller 110*a-n* may implement various monitoring and administrative functions related to compute sleds 105*a-n* that utilize sideband bus connections with various internal components of the respective compute sleds 105*a-n*.

In some embodiments, each compute sled 105*a-n* installed in chassis 100 may be uniquely identified based on a code or other identifier that may be permanently encoded in a non-volatile memory of a respective compute sled 105*a-n* by its manufacturer. As described below, during a provisioning phase of the factory assembly of chassis 100, a signed certificate that specifies hardware components of chassis 100, such as through such identifiers of compute sleds 105*a-n*, that were installed during its manufacture may be stored in a non-volatile memory accessed by a remote access controller 110*a-n* of a compute sled 105*a-n*. Using this signed inventory certificate, a customer may validate that the hardware components of chassis 100 are the same components that were installed at the factory during its manufacture. As described in additional detail below, embodiments may further support secure validation of the replacement, removal or addition of individual compute sleds 105*a-n*, and also supports any subsequent reversal of a compute sled 105*a-n* replacement, removal or addition.

Each of the compute sleds 105*a-n* may include a storage controller 135*a-n* that may be utilized to access storage drives that are accessible via chassis 100. Some of the individual storage controllers 135*a-n* may provide support for RAID (Redundant Array of Independent Disks) configurations of logical and physical storage drives, such as storage drives provided by storage sleds 115*a-n*. In some embodiments, some or all of the individual storage controllers 135*a-n* may be HBAs (Host Bus Adapters) that provide more limited capabilities in accessing physical storage drives provided via storage sleds 115*a-n* and/or via SAS expander 150.

In addition to the data storage capabilities provided by storage sleds 115*a-n*, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located. In some embodiments, a SAS expander 150 and storage drive 155 may be uniquely identified based on a code or other identifier that may be permanently encoded in a non-volatile memory of the SAS expander 150 or storage drive 155 by its respective manufacturer. In instances where SAS expander 150 and storage drives 155 are factory installed, as described below, embodiments may support validation of SAS expander 150 and storage drives 155 as being the same SAS expander and storage drives that were installed at the factory during the manufacture of chassis 100. As described in additional detail below, embodiments may further support secure validation of the replacement or addition of SAS expander 150 and/or individual storage drives 155, and also supports any subsequent reversal of these replacements or additions.

As illustrated, chassis 100 also includes one or more storage sleds 115*a-n* that are coupled to the backplane 160 and installed within one or more bays of chassis 200 in a similar manner to compute sleds 105*a-n*. Each of the individual storage sleds 115*a-n* may include various different numbers and types of storage devices. For instance, storage sleds 115*a-n* may include SAS (Serial Attached SCSI) magnetic disk drives, SATA (Serial Advanced Technology Attachment) magnetic disk drives, solid-state drives (SSDs) and other types of storage drives in various combinations. The storage sleds 115*a-n* may be utilized in various storage configurations by the compute sleds 105*a-n* that are coupled to chassis 100. As illustrated, each storage sled 115*a-n* includes a remote access controller (RAC) 120*a-n* provides capabilities for remote monitoring and management of respective storage sleds 115*a-n*. In some embodiments, each storage sled 115*a-n* may be uniquely identified based on a code or other identifier that may be permanently encoded in a non-volatile memory of the respective storage sled 115*a-n* by its manufacturer. As described below, embodiments support validation of each storage sled 115*a-n* as being a storage sled that was installed at the factory during the manufacture of chassis 100. As described in additional detail below, embodiments may further support secure validation of the replacement, removal or addition of individual storage sleds 115*a-n*, and also supports any subsequent reversal of a storage sled 115*a-n* replacement, removal or addition.

As illustrated, the chassis 100 of FIG. 1 includes a network controller 140 that provides network access to the sleds 105*a-n*, 115*a-n* installed within the chassis. Network controller 140 may include various switches, adapters, controllers and couplings used to connect chassis 100 to a network, either directly or via additional networking components and connections provided via a rack in which chassis 100 is installed. In some embodiments, a network controller 140 may be uniquely identified based on a code or other identifier that may be permanently encoded in a non-volatile memory of the network controller 140 by its manufacturer. As described below, embodiments support validation of network controller 140 as being the same network controller that was installed at the factory during the manufacture of chassis 100. As described in additional detail below, embodiments may further support secure validation of the replacement, removal or addition of network controller 140, and also supports any subsequent reversal of the replacement, removal or addition of network controller 140.

Chassis 100 may similarly include one or more power supply units 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with multiple redundant, hot-swappable power supply units. In some embodiments, a power supply unit 135 may be uniquely identified based on a code or other identifier that may be permanently encoded in a non-volatile memory of the power supply unit 135 by its manufacturer. As described below, embodiments support validation of power supply unit 135 as being the same power supply unit that was installed at the factory during the manufacture of chassis 100. As described in additional detail below, embodiments may further support secure validation of the replacement, removal or addition of power supply unit 135, and also supports any subsequent reversal of the replacement, removal or addition of power supply unit 135.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125a capabilities that provide administrators with the ability to interface with the chassis 100. In some embodiments, each I/O controller 140 may be uniquely identified based on a code or other identifier that may be permanently encoded in a non-volatile memory of the respective I/O controller 140 by its manufacturer. As described below, embodiments support validation of I/O controllers 140 as being the same I/O controllers that were installed at the factory during the manufacture of chassis 100. As described in additional detail below, embodiments may further support secure validation of the replacement, removal or addition of an I/O controller 140, and also supports any subsequent reversal of the replacement, removal or addition of an I/O controller 140.

The chassis management controller 125 may also include a storage module 125c that provides capabilities for managing and configuring certain aspects of the storage devices of chassis 100, such as the storage devices provided within storage sleds 115a-n and within the JBOD 155. In some embodiments, a chassis management controller 125 may be uniquely identified based on a code or other identifier that may be permanently encoded in a non-volatile memory of the chassis management controller 125 by its manufacturer. As described below, embodiments support validation of chassis management controller 125 as being the same chassis management controller that was installed at the factory during the manufacture of chassis 100. As described in additional detail below, embodiments may further support secure validation of the replacement, removal or addition of chassis management controller 125, and also supports any subsequent reversal of the replacement, removal or addition of chassis management controller 125.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for supporting secure and reversible modifications to hardware components the IHS 200. It should be appreciated that although the embodiments described herein may describe an IHS that is a compute sled or similar computing component that may be deployed within the bays of a chassis, other embodiments may be utilized with other types of IHSs that may also support validation of the secure assembly and delivery of the IHS 200, and further support secure and reversible modifications to hardware components the IHS 200. In the illustrative embodiment of FIG. 2, IHS 200 may be a computing component, such as compute sled 105a-n or other type of server, such as an 1RU server installed within a 2RU chassis, that is configured to share infrastructure resources provided by a chassis 100.

As described, an IHS 200 may be assembled and provisioned according to customized specifications provided by a customer. The IHS 200 of FIG. 2 may be a compute sled, such as compute sleds 105a-n of FIG. 1, that may be installed within a chassis, that may in turn be installed within a rack. Installed in this manner, IHS 200 may utilize shared power, network and cooling resources provided by the chassis and/or rack. Embodiments of IHS 200 may include a wide variety of different hardware configurations. Such variations in hardware configuration may result from IHS 200 being factory assembled to include components specified by a customer that has contracted for manufacture and delivery of IHS 200. As described in additional detail below, IHS 200 may include capabilities that allow a customer to validate that the hardware components of IHS 200 are the same hardware components that were installed at the factory during its manufacture, where these validations of the IHS hardware may be initially completed using a factory-provisioned inventory certificate.

As described in additional detail below, IHS 200 may include capabilities that allow a customer to validate that is hardware detected as installed IHS 200 is the same factory installed and provisioned hardware that was supplied to the customer. In addition, embodiments support secure modifications to IHS 200, such as by an administrator that receives a rack-mounted server from the manufacturer and performs hardware customizations to support the requirements of a specific deployment, such as to install a specialized graphics processor 235 for supporting artificial intelligence computations by the IHS 200. In some instances, ownership or control of the IHS 200 may change such that the IHS 200 is provided to another administrator that performs additional hardware customizations, on top of the modifications made by the prior administrator, such as to then install a proprietary FPGA 220 that will implement specific artificial intelligence algorithms that will rely on the hardware accelerator capabilities of the graphics processor 235 installed by the prior owner of the IHS 200. Embodiments supports secure modifications to IHS 200 in such scenarios and further supports secure reversal of these modifications.

IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications. In some embodiments, each of the processors 205 may be uniquely identified based on a code or other identifier that may be permanently encoded in a respective processor 205 by its manufacturer. As described below, embodiments support validation of processors 205 as being the same processors that were installed at the factory during the manufacture of IHS 200.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b. The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory. In some embodiments, each of the memory modules 210a-n may be uniquely identified based on a code or other identifier that may be permanently encoded in a respective memory module 210a-n by its manufacturer. As described below, embodiments support validation of memory modules 210a-n as being the same memory modules that were installed at the factory during the manufacture of IHS 200. As described in additional detail below, embodiments may further support secure validation of the replacement, removal or addition of memory modules 210a-n, and also supports any subsequent reversal of the replacement, removal or addition of memory modules 210a-n.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources and/or other peripheral components.

As illustrated, IHS 200 may include one or more FPGA (Field-Programmable Gate Array) cards 220. Each of the FPGA card 220 supported by IHS 200 may include various processing and memory resources, in addition to an FPGA logic unit that may include circuits that can be reconfigured after deployment of IHS 200 through programming functions supported by the FPGA card 220. Through such reprogramming of such logic units, each individual FGPA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units, each of which may be separately programmed to implement different computing operations, such as in computing different operations that are being offloaded from processor 205. The FPGA card 220 may also include a management controller 220a that may support interoperation with the remote access controller 255 via a sideband device management bus 275a. In some embodiments, each of the FPGA cards 220 installed in IHS 200 may be uniquely identified based on a code or other identifier that may be permanently encoded in the FPGA card 220 by its manufacturer. As described below, embodiments support validation of FPGA card 220 as being the same FPGA card that was installed at the factory during the manufacture of IHS 200. As described in additional detail below, embodiments may further support secure validation of the replacement, removal or addition of FPGA card 220, and also supports any subsequent reversal of the replacement, removal or addition of FPGA card 220.

Processor(s) 205 may also be coupled to a network controller 225 via in-band bus 215, such as provided by a Network Interface Controller (NIC) that allows the IHS 200 to communicate via an external network, such as the Internet or a LAN. In some embodiments, network controller 225 may be a replaceable expansion card or adapter that is coupled to a motherboard connector of IHS 200. In some embodiments, network controller 225 may be an integrated component of IHS 200. In some embodiments, network controller 225 may be uniquely identified based on a code or other identifier, such as a MAC address, that may be permanently encoded in a non-volatile memory of network controller 225 by its manufacturer. As described below, embodiments support validation of network controller 225 as being the same network controller that was installed at the factory during the manufacture of IHS 200, or as being a trusted network controller installed by the customer. As described in additional detail below, embodiments may further support secure validation of the replacement, removal or addition of network controller 225, and also supports any subsequent reversal of the replacement, removal or addition of network controller 225.

A variety of additional components may be coupled to processor(s) 205 via in-band bus 215. For instance, processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255. In some embodiments, components such as power management unit 260 and graphics processor 235 may also be uniquely identified based on a code or other identifier that may be permanently encoded in a non-volatile memory of these components by their respective manufacturer. As described below, embodiments support validation of these components as being components that were installed at the factory during the manufacture of IHS 200.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255. As described in additional detail below, in some embodiments, BIOS may be configured to identify hardware components that are detected as being currently installed in IHS 200. In such instances, the BIOS may support queries that provide the described unique identifiers that have been associated with each of these detected hardware components by their respective manufacturers.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 255 that supports remote management of IHS 200 and of various internal components of IHS 200. In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the operating system of IHS 200 (i.e., in a bare-metal state). In some embodiments, certain operations of the remote access controller 225, such as the described inventory certificate generation and validation operations, may operate using validated instructions, and thus within the root of trust of IHS 200.

In some embodiments, remote access controller 255 may be uniquely identified based on a code or other identifier that may be permanently encoded in a non-volatile memory of the remote access controller 255 by its manufacturer. As described below, embodiments support validation of remote access controller 255 as being the same controller that was installed at the factory during the manufacture of IHS 200. Also as described below, during a provisioning phase of the factory assembly of IHS 200, a signed certificate that specifies factory installed hardware components of IHS 200 that were installed during manufacture of the IHS 200 may be stored in a non-volatile memory that is accessed by remote access controller 255. Using this signed inventory certificate stored by the remote access controller 255, a customer may validate that the detected hardware components of IHS 200 are the same hardware components that were installed at the factory during manufacture of IHS 200. As described in additional detail below, embodiments may further support secure validation of the replacement, removal or addition of hardware components of IHS 200 that are managed by remote access controller 255, and also supports any subsequent reversal of these changes.

In support of the capabilities for validating the detected hardware components of IHS 200 against the inventory information that is specified in a signed inventory certificate, remote access controller 255 may support various cryptographic capabilities. For instance, remote access controller 255 may include capabilities for key generation such that remote access controller may generate keypairs that include a public key and a corresponding private key. As described in additional detail below, using generated keypairs, remote access controller 255 may digitally sign inventory information collected during the factory assembly of IHS 200 such that the integrity of this signed inventory information may be validated at a later time using the public key by a customer that has purchased IHS 200. Using these cryptographic capabilities of the remote access controller, the factory installed inventory information that is included in an inventory certificate may be anchored to a specific remote access controller 255, since the keypair used to sign the inventory information is signed using the private key that is generated and maintained by the remote access controller 255.

In some embodiment, the cryptographic capabilities of remote access controller 255 may also include safeguards for encrypting any private keys that are generated by the remote access controller and further anchoring them to components within the root of trust of IHS 200. For instance, a remote access controller 255 may include capabilities for accessing hardware root key (HRK) capabilities of IHS 200, such as for encrypting the private key of the keypair generated by the remote access controller. In some embodiments, the HRK may include a root key that is programmed into a fuse bank, or other immutable memory such as one-time programmable registers, during factory provisioning of IHS 200. The root key may be provided by a factory certificate authority, such as described below. By encrypting a private key using the hardware root key of IHS 200, the hardware inventory information that is signed using this private key is further anchored to the root of trust of IHS 200. If a root of trust cannot be established through validation of the remote access controller cryptographic functions that are used to access the hardware root key, the private key used to sign inventory information cannot be retrieved. In some embodiments, the private key that is encrypted by the remote access controller using the HRK may be stored to a replay protected memory block (RPMB) that is accessed using security protocols that require all commands accessing the RPMB to be digitally signed using a symmetric key and that include a nonce or other such value that prevents use of commands in replay attacks. Stored to an RPMG, the encrypted private key can only be retrieved by a component within the root of trust of IHS 200, such as the remote access controller 255.

Remote access controller 255 may include a service processor 255*a*, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225*c* may support connections with remote access controller 255 using wired and/or wireless network connections via a variety of network technologies. As a non-limiting example of a remote access controller, the integrated Dell Remote Access Controller (IDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275*a-d* that may be individually established with each of the respective managed devices 220, 225, 230, 280 through the operation of an I2C multiplexer 255*d* of the remote access controller. As illustrated, certain of the managed devices of IHS 200, such as non-standard hardware 220, network controller 225 and storage controller 230, are coupled to the IHS processor(s) 205 via an in-line bus 215, such as a PCIe root complex, that is separate from the I2C sideband bus connections 275*a-d* used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255*a* of remote access controller 255 may rely on an I2C co-processor 255*b* to implement sideband I2C communications between the remote access controller 255 and managed components 220, 225, 230, 280 of the IHS. The I2C co-processor 255*b* may be a specialized co-processor or microcontroller that is configured to interface via a sideband I2C bus interface with the managed hardware components 220, 225, 230, 280 of IHS. In some embodiments, the I2C co-processor 255*b* may be an integrated component of the service processor 255*a*, such as a peripheral system-on-chip feature that may be provided by the service processor 255*a*. Each I2C bus 275*a-d* is illustrated as single line in FIG. 2. However, each I2C bus 275*a-d* may be comprised of a clock line and data line that couple the remote access controller 255 to I2C endpoints 220*a*, 225*a*, 230*a*, 280*a* which may be referred to as modular field replaceable units (FRUs).

As illustrated, the I2C co-processor 255*b* may interface with the individual managed devices 220, 225, 230, 280 via individual sideband I2C buses 275*a-d* selected through the operation of an I2C multiplexer 255*d*. Via switching operations by the I2C multiplexer 255*d*, a sideband bus connection 275*a-d* may be established by a direct coupling between the I2C co-processor 255*b* and an individual managed device 220, 225, 230, 280. In providing sideband management capabilities, the I2C co-processor 255*b* may each interoperate with corresponding endpoint I2C controllers 220*a*, 225*a*, 230*a*, 280*a* that implement the I2C communications of the respective managed devices 220, 225, 230. The endpoint I2C controllers 220*a*, 225*a*, 230*a*, 280*a* may be implemented as a dedicated microcontroller for communicating sideband I2C messages with the remote access controller 255, or endpoint I2C controllers 220*a*, 225*a*, 230*a*, 280*a* may be integrated SoC functions of a processor of the respective managed device endpoints 220, 225, 230, 280.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
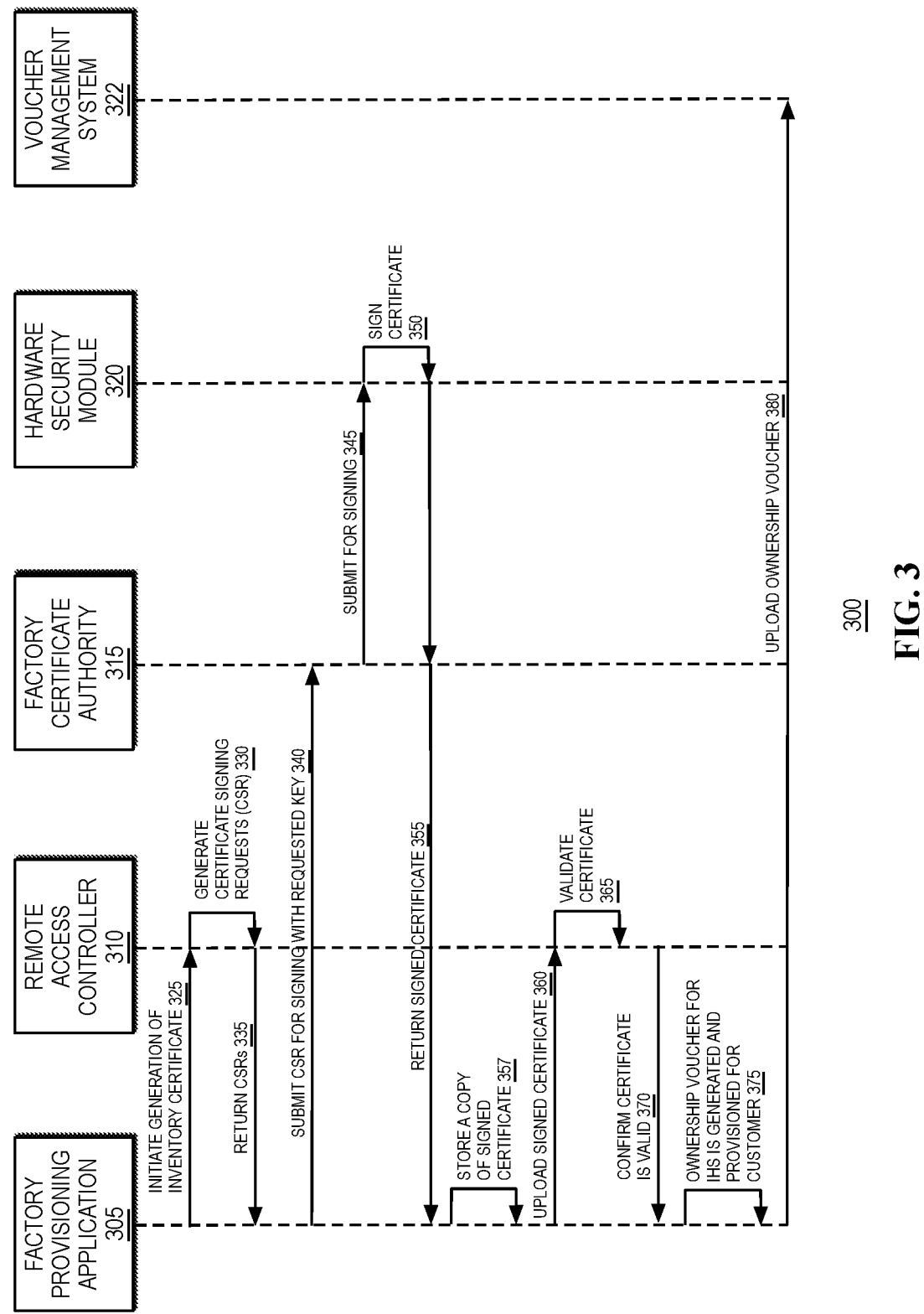
FIG. 3 is a swim lane diagram illustrating certain responsibilities of components of a system configured according to certain embodiments for factory provisioning of an IHS in a manner that supports secure and reversible modifications to hardware components the IHS.

FIG. 3 is a swim lane diagram illustrating certain responsibilities of components of a system configured according to certain embodiments for factory provisioning of an IHS in a manner that supports secure and reversible modifications to hardware components the IHS. FIGS. 4A-C are a flowchart describing certain steps of a method, according to some embodiments, for factory provisioning of an IHS in a manner that supports secure and reversible modifications to hardware components the IHS. Some embodiments of the method of FIGS. 4A-C may begin, at block 405, with the factory assembly of an IHS, such as the assembly of a server described with regard to FIGS. 1 and 2. In some instances, an IHS may be manufactured using a factory process that includes multiple phases of assembly, validation and provisioning that must be completed before the IHS is supplied to a customer. As described, an IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a manifest that tracks the individual hardware components that are installed in an IHS. As described above, the installed hardware components may include standard components and may also include specialized components that have been requested by a specific customer that has contracted for the assembly and delivery of an IHS.

Once the assembly of an IHS has been completed, the IHS may be subjected to manual and automated inspections that confirm the IHS has been properly assembled and does not include any defects. After confirming an IHS has been assembled without any manufacturing defects, at block 410, factory provisioning of the IHS may be initiated. In some instances, the provisioning of an IHS at the factory may include various stages that may include stages for loading of firmware, configuring hardware components, and installing an operating system and other software. As indicated in FIG. 3, various aspects of this factory provisioning process may be conducted using a factory provisioning application 305, where this factory provisioning application may run on one or more servers and may interface with an IHS that is being provisioned once a requisite amount of firmware and software has been installed to the IHS.

As described, a manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. At block 415, a manifest generated during assembly of an IHS is provided to the factory provisioning application 305 that is being used to provision the assembled IHS. Based on this hardware manifest information, at block 420, the factory provisioning application 305 may also initiate the generation of an inventory certificate that may be used to validate that the detected hardware components of the IHS are the same hardware components that were installed during the factory assembly of the IHS. As described in additional detail below, in embodiments, validation of the IHS hardware as factory installed using the inventory certification may be extended through the use of a delta certificates that are generated based on designated administrators making modifications to the factory installed hardware, where authorization to generate such delta certificates is managed through a voucher system that also supports reversal of these modifications.

As described with regard to FIGS. 1 and 2, an IHS may include a remote access controller that provides capabilities for remote management of an IHS, where these remote management capabilities may include sideband management of various hardware components of an IHS. As indicated in FIG. 3, the generation of an inventory certificate for a newly assembled IHS, at 325, may be initiated via a request from the factory provisioning application 305 to the remote access controller 310 of the IHS. As described with regard to FIG. 2, a remote access controller of an IHS may include cryptographic capabilities that operate within the root of trust of the IHS and that include the ability to generate cryptographic keypairs. Utilizing such cryptographic capabilities, at block 425, the remote access controller 310 initiates the generation of an inventory certificate by generating a cryptographic key pair for use in validating the authenticity of inventory information that is included in an inventory certificate.

At block 430 and at 330, the remote access controller 310 generates a certificate signing request (CSR) for a digital identity certificate, where the request specifies the public key of the key pair generated by the remote access controller and also specifies the factory installed hardware inventory from the manifest that was generated during assembly of the IHS. The factory installed hardware inventory information included in the CSR may be signed by the remote access controller using the private key from the generated keypair. At block 435 and at 335, the CSR for the requested inventory certificate is transmitted to the factory provisioning application 305 by the remote access controller 310. At block 440, the remote access controller safeguards the private key from the generated key pair. In some embodiments, the remote access controller may encrypt the private key using the hardware root key (HRK) of the IHS and may store the encrypted key to a protected memory, such as the replay protected memory block that is described with regard to FIG. 2.

Upon receiving the certificate signing request from the remote access controller 310, at block 445 and at 340, the factory provisioning application 305 submits the CSR for signing by a factory certificate authority 315. In some embodiments, the factory provisioning application 305 specifies a factory key to be used by the factory certificate authority 315 in signing the inventory certificate. For instance, the factory provisioning application may include the name of a trusted certificate associated with a factory key as an attribute of the CSR that is transmitted to the factory certificate authority 315. Upon receipt of the CSR, at block 450, the factory certificate authority parses from the CSR: the hardware inventory information, the public key generated by the remote access controller and the information specifying the requested signing key. Based on the information parsed from the CSR, the factory certificate authority generates a digital identity certificate, referred to herein as an inventory certificate, that is associated with the public key provided by the remote access controller and that specifies the factory installed hardware inventory of the IHS.

As indicated in FIG. 3, at 345, the factory certificate authority 315 submits the generated inventory certificate for signing by a hardware security module 320 that may be a dedicated hardware component of a factory provisioning server that safeguards cryptographic keys and implements cryptographic functions utilized in the factory provisioning process. In some embodiments, the factory certificate authority 315 may also specify a certificate name associated with a signing key that is maintained by the hardware security module 320. At 350, the hardware security module 320 utilizes the private key associated with the specified certificate in order to digitally sign the submitted inventory certificate, which includes the inventory of the factory installed hardware components of the IHS. The signed inventory certificate is then returned to the factory certificate authority 315 by the hardware security module 320.

Once the inventory certificate has been signed, at block 460 and at 355, the signed inventory certificate is transmitted from the factory certificate authority 315 to the factory provisioning application 305. As indicated in FIG. 3 at 357, the factory provisioning application 305 may store a copy of the signed inventory certificate. In some instances, the copy may be saved to a data store utilized in providing ongoing support of the IHS once it has been shipped and has been deployed by a customer. Once the IHS is deployed, embodiments may be utilized by designated administrators to augment this factory-provisioned inventory certificate with one or more delta certificates that each specify modifications to the hardware of the IHS, such as adding, removing or replacing a hardware components of the IHS. In embodiments, authorization to generate such delta certificates may be managed through an ownership voucher that also support reversal of the modifications, thus supporting reverting of the IHS to a prior validated operating state.

At block 465 and at 360, the signed inventory certificate is than loaded to the assembled IHS. As indicated in FIG. 3, in some embodiments, the signed inventory certificate may be uploaded to a remote access controller 310 of the assembled IHS, such that the signed inventory certificate may be stored to a nonvolatile memory or other persistent storage that is accessible by the remote access controller 310 independent from the operating system of the IHS. In other embodiments, the signed inventory certificate may be uploaded without reliance on the remote access controller to another non-volatile memory of the IHS.

Some embodiments may continue, at 365, with the validation of the signed inventory certificate by the remote access controller 310. Using the private key from the generated keypair, at block 470, the remote access controller decrypts the signature included by the remote access controller in the CSR and confirms that the inventory information included in the signed inventory certificate matches the inventory information that was submitted in the certificate signing request, thus validating the integrity of the generation of the signed inventory certificate. At block 472, the remote access controller confirms that the inventory included in the signed inventory certificate is valid and, at 370, the remote access controller 310 confirms the validity of the inventory certificate with a notification to the factory provisioning application 305.

With the generation and validation of the signed inventory certificate completed, embodiments continue in FIG. 4B with procedures for provisioning an ownership voucher for the IHS, where this ownership voucher is used in establishing ownership of the IHS for the purposes of the administration of the IHS and in particular for modifying the factory-installed hardware of the IHS. As described, once an IHS has been delivered, it may be customized over time for particular computing tasks, such as to support a specific artificial intelligence or data storage system. As such, despite the IHS being manufactured according to specifications provided by a customer, the IHS may nonetheless require further customization in order for the IHS to be deployed, such as for deployment within a specific datacenter. Accordingly, an IHS according to embodiments is expected to be modified once it has been delivered and deployed by the customer for which the IHS is being manufactured and provisioned. In other instances, an IHS may be manufactured without specifications provided by a customer and is thus manufactured for general use in a data center environment, where the hardware of such general purposes IHSs is also expected to be modified over time. Embodiments thus support capabilities that support secure modifications to the factory-installed hardware of the IHS, where modifications are secured through the operation of a voucher used to establish ownership of the IHS for purposes of making modifications to its factory-installed hardware.

The provisioning of an ownership voucher for the IHS may proceed, at 475, with the factory provisioning application identifying the customer for which the IHS is being manufactured and factory provisioned. In some instances, this IHS may be shipped directly to this customer. In other instances, an IHS may be shipped to a location specified by the customer, where it will be received by administrators and deployed. For instance, a customer may choose to ship the IHS to the data center or other location where it will be deployed. Accordingly, at 477, the factory provisioning application identifies credentials used to identify an designated administrator that will be receiving the IHS and is authorized to configure it further, in particular to modify the factory-installed hardware of the IHS. In some instances, this receiving administrator is the customer. In other instances, this receiving administrator is an entity or individual designated by the customer. In some embodiments, the customer may provide an cryptographic identity certificate that is usable in identifying the designated receiving administrator or administrative entity.

Once the identity certificate for the designated receiving administrator has been obtained, at 480, the factory provisioning application obtains an identity certificate for identifying the manufacturer of the IHS as an owner, an in particular the original owner, of the IHS, with respect to authority to modify the hardware of the IHS. As described, the factory provisioning application may interface with a factory certificate authority 315 that is used in the generation of the inventory certificate that was requested by the remote access controller of the IHS and vouchers for control, by the remote access controller, of the credentials specified in the certificate. In some embodiments, this factory certificate authority 315 may also generate an identity certificate that is associated with credentials of the manufacturer and useable for authenticating communications from the manufacturer.

With identity certificates obtained for the manufacturer and for the receiving designated administrator, at 482, embodiments generate an ownership voucher for use in establishing ownership of the IHS, with respect to authorization to modify the factory-installed hardware of the IHS. In some embodiments, such ownership vouchers may be compliant with or analogous to FIDO (Fast IDentity Online) vouchers that are useable in tracking the ownership of devices starting from their manufacture and through the provisioning and onboarding for deployment. However, whereas FIDO-type vouchers may be useful in determining the current owner of a device, it does not include capabilities for reversing modifications made be successive owners of an IHS, and does not include capabilities for use of the described inventory certificate in validating the authenticity of the detected hardware of the IHS and modifications made by each successive owner to the factory-installed hardware of the IHS. In some embodiments, the generated ownership voucher may be bound to the IHS by including the inventory certificate, or a digital signature included in the inventory certificate, in the ownership voucher. This inventory certificate is then associated in the ownership voucher as the factory-installed hardware installed by the first designated administrator of the IHS, namely its manufacturer.

Embodiments may continue, at 485, by including the identity certificate, or other form of authentication, of the manufacturer in the ownership voucher. In particular, this identity certificate is specified in the ownership voucher as the identity of the prior owner of the IHS. At this junction in the factory provision of the IHS, the inventory certificate has been generated based on the factory-installed hardware and the IHS is being reading for transfer to the administrator designated by the customer. As such, the manufacturer relinquishes control of the IHS with respect to modifying the factory-installed hardware to this designated administrator and is now the prior owner of the IHS, per the ownership voucher.

Factory provisioning of the ownership voucher continues, at 487, by including the identity certificate, or other form of authentication, of the designated administrator in the ownership voucher. In particular, this identity certificate of the designated administrator is specified in the ownership voucher as the identity of the current owner of the IHS. Through this designation, the manufacturer transfers authority to modify the factory-installed hardware of the IHS to the designated administrator. As described, multiple phases of administration may be required to ready an IHS for deployment within a specific data. Also as described, an IHS may be relocated and/or repurposed throughout its lifetime. Accordingly, authority to modify the factory-installed hardware may be transferred to multiple designated administrators throughout the lifetime of an IHS. In embodiments, each time ownership of an IHS is transferred to a different owner with authority to modify the hardware of the IHS, the identity certificate or other form of authentication of the new owner is added to the ownership voucher. In this manner, the ownership voucher may record the ownership history of the IHS, showing each designated administrator that has been designated authority to make hardware modifications.

As described in additional detail below, such hardware modifications may be authenticated through the use of delta certificates that can be used to authenticate hardware modifications made by a designated administrator, where this designated administrator is identified based on being authenticated as the current owner specified in the ownership voucher. In some embodiments, each delta certificate generated in response to a hardware modification by a designated administrator, or a digital signature associated with a delta certificate, may be included in the ownership voucher as being a modification made by the current owner. As the IHS is transferred to a new owner, the identity certificate of the current owner is re-designated as the identity of the prior owner of the IHS, with the delta certificate(s) generated by that owner now specified in the ownership voucher as hardware modifications made by this prior owner. In this manner, the ownership voucher may record a chain or tree of ownership vouchers for the designated administrators that have been authorized to modify the hardware of the IHS, with any hardware modifications made by each of these designated administrators also specified in the ownership voucher. As described in additional detail below, using these capabilities of the ownership voucher, embodiments support reversible modifications to an IHS, where an IHS can be reverted to a prior authenticated state.

Once the ownership voucher has been generated, at 490, it is uploaded to a voucher management system. As described in additional detail below, the voucher management system may be a cloud-based or other remote system used in managing ownership of a hardware device or system. In embodiments, the voucher management system manages the availability of the ownership vouchers created for authorizing modifications to IHS. A voucher management system may support authentication of requests for access to a voucher of an IHS, such as in limiting access to vouchers to requestors that are authenticated by the remote access controller of the IHS. In some embodiments, access to ownership vouchers by the voucher management system may remain disabled until a requestor provides confirmation that the IHS has been successfully validated as operating using factory-installed hardware specified in the inventory certificate associated with the ownership voucher, and any discrepancies to the factory-installed hardware are accounted for in the delta certificates associated with the ownership voucher. With the provisioning of the ownership voucher for the IHS completed through uploading the ownership voucher to the voucher management system, additional factory provisioning of the assembled IHS may be completed and, at block 490, the assembled IHS may be shipped from the factory to the designated administrator.

Figure 5:
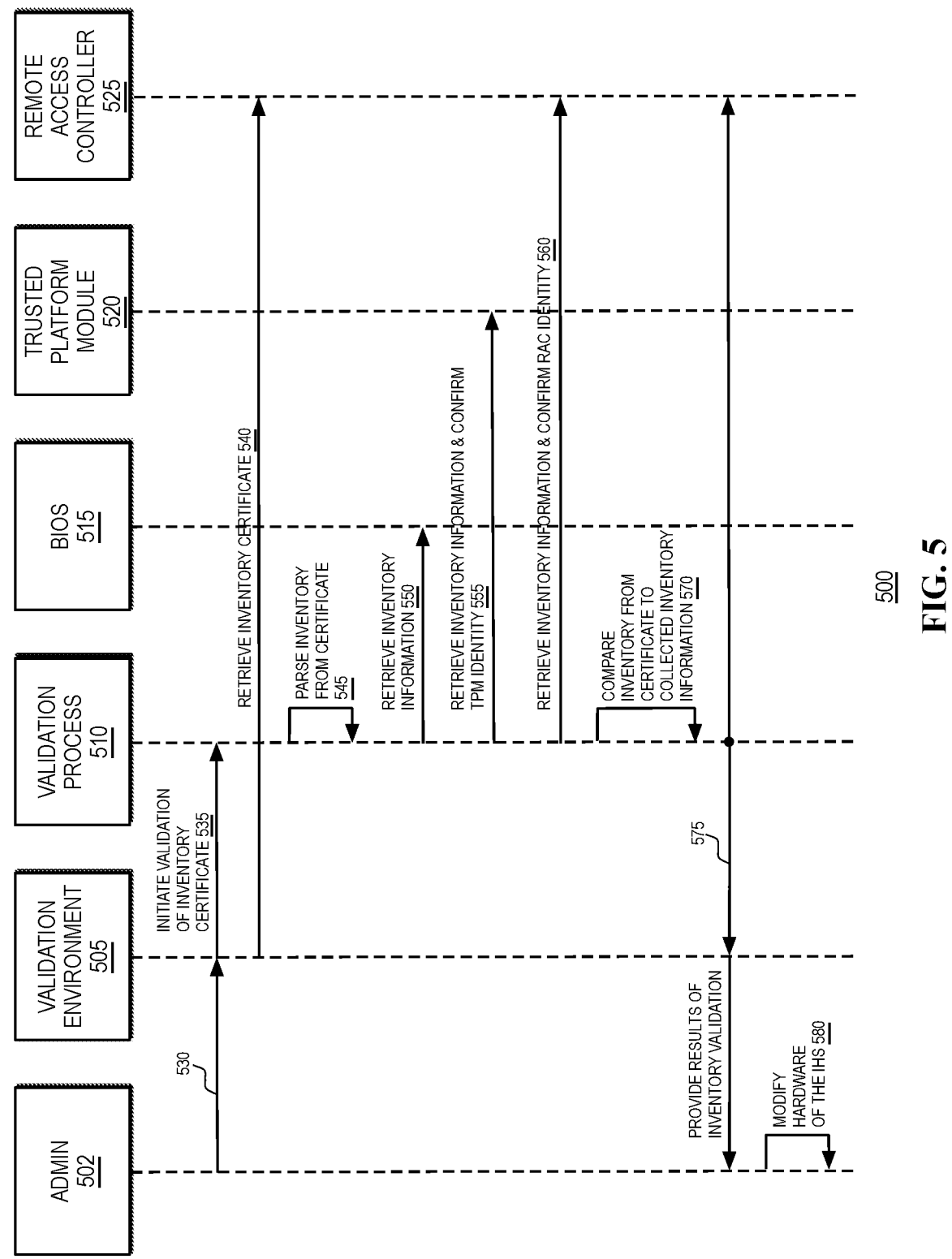
FIG. 5 is a swim lane diagram illustrating certain responsibilities of components of an system configured according to certain embodiments for validation of hardware components an IHS.
Figure 6A:
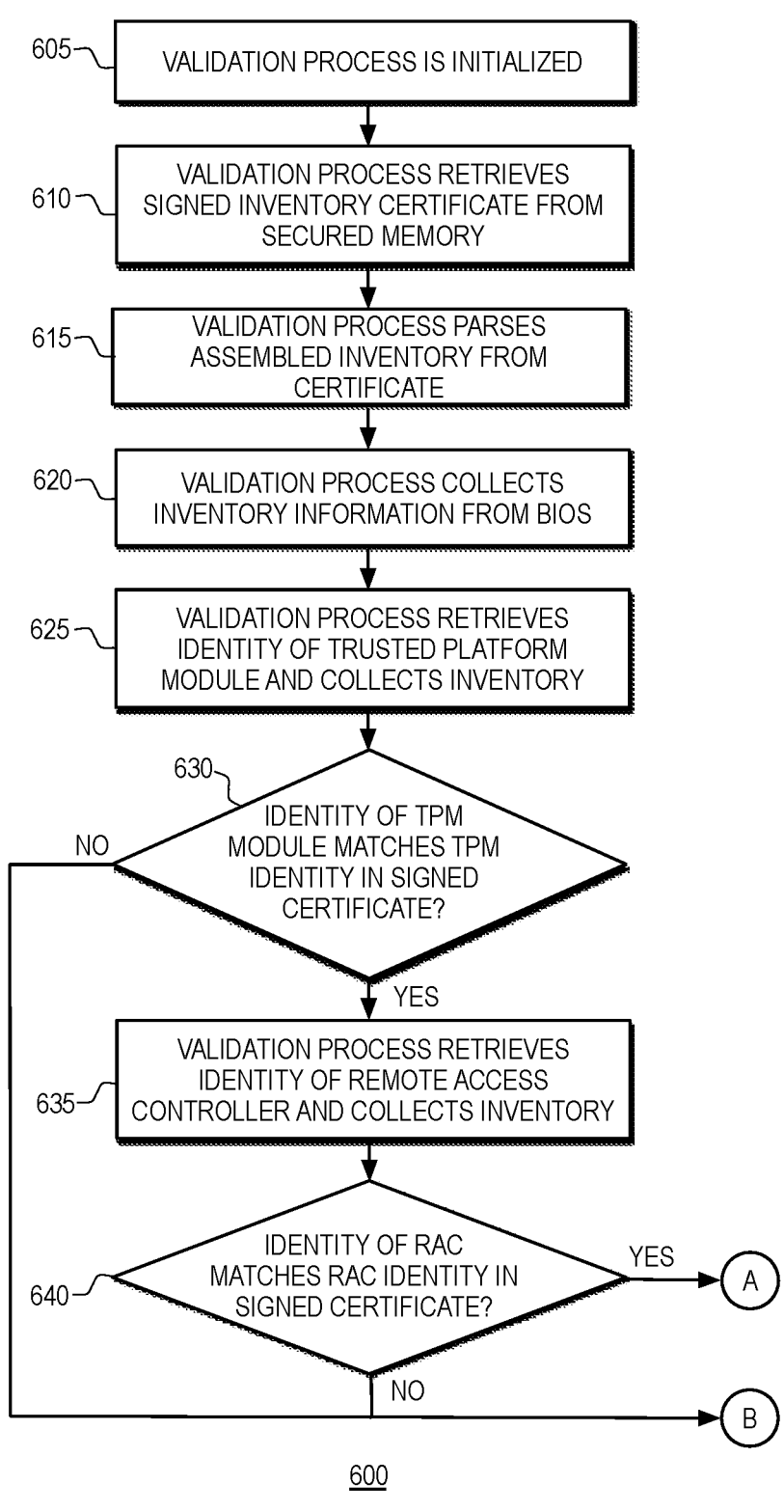
FIG. 6A is a flowchart describing certain steps of a method, according to some embodiments, for validation of hardware components an IHS.
Figure 6B:
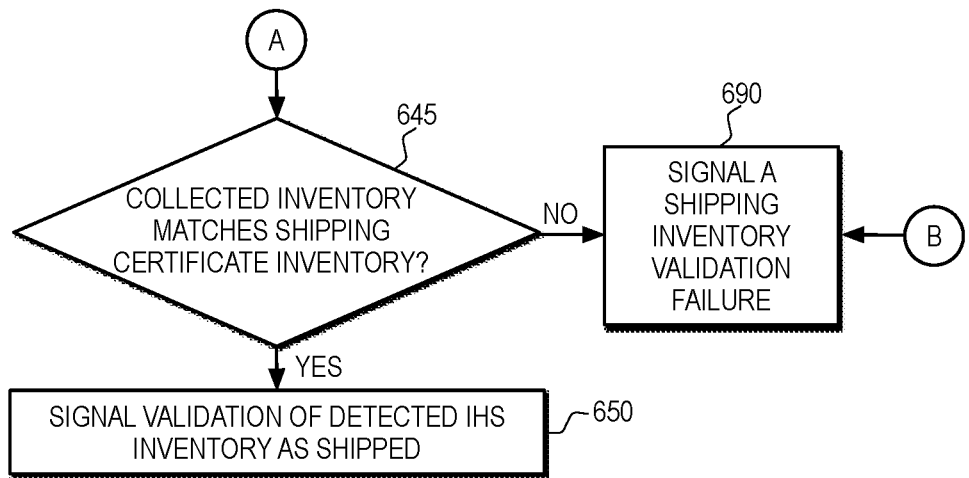
FIG. 6B is a flowchart that is a continuation of FIG. 6A.

FIG. 5 is a swim lane diagram illustrating certain responsibilities of components of an IHS configured according to certain embodiments for use of an inventory certificate in the validation of the hardware components of the IHS. FIGS. 6A-B are a flowchart describing certain steps of a method, according to some embodiments, for use of an inventory certificate in the validation of the hardware components of the IHS. Embodiments may begin with the delivery of an IHS to the designated administrator, where the IHS has been assembled and provisioned according to the procedures set forth above. In particular, the delivered IHS has been provisioned at the factory to include a signed inventory certificate that specifies the factory installed hardware components of the IHS.

Upon receiving an IHS configured in this manner, the IHS may be unpacked, assembled and initialized by an administrator 502. In some instances, an IHS may be ready for immediate deployment by a customer. In other instances, an IHS may require further provisioning by customer before it is deployed, such as for operation within a particular data center. As such, in various instances, an IHS may be unpacked, assembled and initialized in order to deploy the IHS or to prepare it for further provisioning. In some instances, this provisioning of the IHS for use within a particular data center or for supporting a specific computing workload may include an administrator 502 making modifications to the hardware of the IHS, such as adding, removing or replacing hardware. For example, an administrator 502 receiving a new IHS at a datacenter may be tasked within installing a specialized network controller 225 that supports high-speed data links with nearby IHSs, such as a particularly configured PCIe controller. Embodiments support such capabilities through the use of a delta certificate generated based upon a request by such an designated administrator. However, in some embodiments, such modifications to the factory-installed hardware are not supported until an initial validation of the detected hardware of the IHS as being the factory-installed hardware. In such embodiments, only after this initial validation has been completed is the ownership voucher of the IHS enabled for use in generating this delta certificate for use in validating the addition of hardware by the administrator 502. As such, embodiments may continue with this initial validation of the detected hardware of the IHS as being factory-installed.

At block 605, the IHS has been powered and validation process is initialized. In some instances, the validation process may be initialized as part of the initial provisioning of an IHS by a customer. In other instances, the validation process may be initialized, at 530, by an administrator as part of an onboarding procedure for configuring modifications to the hardware of the IHS. In some embodiments, the validation process may run within a pre-boot environment, such as a PXE (Preboot execution Environment) operating environment. In some embodiments, a PXE operating environment in which a validation process runs may be retrieved from a network location and may thus be executed using the processing and memory capabilities of the IHS. In some embodiments, a PXE operating environment may be retrieved using secure protocols, such as HTTPS, in order to assure the integrity of the operating environment instructions that are utilized. In some embodiments, a pre-boot operating environment in which the validation process runs may include an operating environment that is executed by the remote access controller of the IHS based on validated firmware instructions. In these embodiments that utilize a pre-boot operating environment, the validation of the detected hardware components of the IHS is conducted prior to booting of the operating system of the IHS.

In some embodiments, the validation process may run as part of a diagnostic mode that is supported by an IHS. For instance, an IHS may support a diagnostic mode that may be initiated by a user or may be initiated automatically in response to detecting various conditions, where the diagnostic mode may support various diagnostic tools, including the described hardware validation procedures. In some embodiments, the diagnostic mode may involve re-booting the IHS to a diagnostic environment, while other embodiments may support diagnostic mode operations that run within the operating system of the IHS. Accordingly, some embodiments may support the described hardware validation procedures as a feature available within the operating system of the IHS. In such embodiments, the operating system may be configured to periodically conduct the described hardware validation procedures, such as on a daily or weekly basis. The operating system may likewise be configured to conduct the hardware validation procedures in response to a detected security notification, such as a notification that a process is attempting to access a protected resource. In some embodiments, the described validation procedures may be implemented remotely, such as via the described HTTPS protocols, where the remote validation procedures may rely both on information retrieved from the IHS via HTTPS and on remote information, such as information maintained by the manufacturer of the IHS or by an entity supporting the administration of the IHS.

As indicated at 535 of FIG. 5, an inventory certificate validation process 510 is initiated within a validation environment 505 that may include a pre-boot environment, a diagnostic environment or other environment supporting the validation process. In some embodiments, the inventory certificate validation process 510 operates based on validated instructions, such as based on instructions that, when used to calculate a hash value, are confirmed to correspond to a value stored in an immutable memory of the IHS during its factory provisioning. In this manner, the inventory certificate validation process 510 may be added to the root of trust of the IHS. At block 610 and as indicated at 540, the inventory certificate validation process 510 retrieves the signed inventory certificate from the remote access controller 525, or from a persistent memory of the IHS. As described above, the factory provisioning process may include uploading a signed original inventory certificate to the remote access controller or to a persistent memory of the IHS. At block 615 and at 545, the inventory certificate validation process 510 parses the hardware inventory information from the signed inventory certificate. Using the public key provided in the signed inventory certificate, the inventory validation process 510 may confirm the integrity of the inventory information that is included in the signed inventory certificate.

In some scenarios, the inventory certificate validation process 510 may commence by collecting an inventory of the detected hardware components of the IHS. In some instances, this collection of inventory information may be initiated earlier by the inventory certificate validation process, such as during initialization of the IHS. At block 620 and as indicated at 550, the inventory certificate validation process 510 may query the BIOS 515 of the IHS for an inventory of hardware components that have been detected by BIOS 515. At block 625 and as indicated at 555, the inventory certificate validation process 510 may retrieve additional hardware inventory information from a Trusted Platform Module (TPM) 520 of the IHS. In some instances, the TPM 520 may identify hardware components that are also identified by BIOS 515. However, in some instances, the TPM 520 may identify certain hardware components, such as secure memory modules, that are not identified by BIOS 515.

As described with regard to FIG. 2, a Trusted Platform Module may serve to establish an initial hardware root of trust in an IHS such that the hardware components within this root of trust operate using validated software instructions. Accordingly, in some embodiments, the inventory certificate validation process 510 may compare identity information for the detected TPM 520 against the TPM identity information that is parsed from the inventory certificate at block 545. In some instances, the detection of any discrepancies between the identity of the TPM specified in the inventory certificate and the identity reported by TPM 520 may result in terminating any further validation procedures.

At block 630, the validation process may confirm the identity of the detected TPM against the identity of the TPM reported in the signed inventory certificate. If the identity of the TPM is successfully validated, validation may continue at block 635. However, if the identity of the TPM is not validated, at block 690, the validation process may signal a core inventory validation failure since any discrepancies between the identity of the factory installed TPM and the TPM that has been detected signals a potential compromise in the root of trusted hardware components of the IHS.

At block 635 and as indicated at 560, the inventory certificate validation process 510 may retrieve additional hardware inventory and thermal information from a remote access controller 525 of the IHS. As with TPM 520, remote access controller 525 may provide redundant identification of some hardware components and may provide exclusive identification of other hardware components, such as internal memories, management controllers or logic units utilized by the remote access controller 525. The validation process may also query the remote access controller 525 for any thermal information that is available for each of the detected hardware components, such as any ASHRAE classifications or ratings reported as applicable for each of these detected hardware components. In some embodiments, the sideband management capabilities of the remote access controller 525, such as described with regard to FIG. 2, may be utilized to query all thermal information reported as being used in the management of the detected hardware components. The validation process may query the remote access controller 525 for any available thermal information, whether for hardware reported by the remote access controller 525, TPM 520 or the BIOS 515.

As with TPM 520, in some embodiments, the inventory certificate validation process 510 may compare identity information for the detected remote access controller 525 against the remote access controller identity information that is parsed from the inventory certificate at block 545. In some instances, the detection of any discrepancies between the identity of the remote access controller specified in inventory certificate and the identity reported by remote access controller 525 may also result in terminating any further validation procedures.

At block 640, the validation process 510 may confirm the identity of the detected remote access controller against the identity of the remote access controller reported in the signed inventory certificate. If the remote access controller is successfully validated, validation may continue at block 645. Otherwise, if the identity of the remote access controller is not validated, at block 690, the inventory certificate validation process may signal a core inventory validation failure. As with the TPM, any discrepancies between the identity of the factory installed remote access controller and the remote access controller detected in the initialized IHS signals a potential compromise of the root of trust of the IHS.

The inventory certificate validation process 510 may retrieve additional inventory and thermal information from any other available data sources, such as directly from the processor of the IHS or from a chassis management controller of a chassis in which the IHS has been installed. Upon completion of the collection of the detected hardware components of the initialized IHS, at block 570, the inventory certificate validation process compares the collected inventory information of the detected components against the inventory information that is parsed from the signed inventory certificate. If the unique identifiers of the detected hardware components of the initialized IHS match the identifiers of the factory installed hardware components from the signed inventory certificate, at block 650 and 575, the inventory validation process 510 signals a successful validation of the detected hardware of the IHS as being factory-installed hardware, including providing notification of the successful validation to the administrator 502. The customer receiving delivery of the IHS is thus assured that the IHS is operating using only hardware components that were installed at the factory during manufacture of the IHS, with no missing or additional hardware components detected.

If any hardware components are detected that are not identified in the inventory from the certificate, at block 690, the validation process may signal an inventory validation failure. In some embodiments, an inventory validation failure will also be signaled if the validation process identifies is unable to detect components that are specified in the inventory certificate. In some embodiments, a validation failure may be signaled if factory-installed hardware components specified by the inventory certificate are not detected. In this manner, successful validation requires confirming that an IHS is operating using all of the factory-installed hardware, and no additional hardware.

As indicated in FIG. 5, if the hardware of the IHS is validated as genuine, embodiments may continue with the administrator 502 modifying the hardware of the IHS, such as the described scenarios in which hardware components of the IHS may be removed, added or replaced. However, once these hardware modifications are made, the validation procedures of FIGS. 5 and 6 will result in a failure to validate the hardware of the IHS as factory-installed, according to the inventory set forth in the inventory certificate. As described in addition detail below, in order to validate these modifications, embodiments support the generation of delta certificates that can be used to confirm the authenticity of detected modifications to the factory-installed hardware of the IHS. However, embodiments may restrict the generation of any such delta certificates via use of an ownership voucher that may not be enabled until the initial validation of the hardware of the IHS as factory-installed is successfully completed for the first time.

Figure 7:
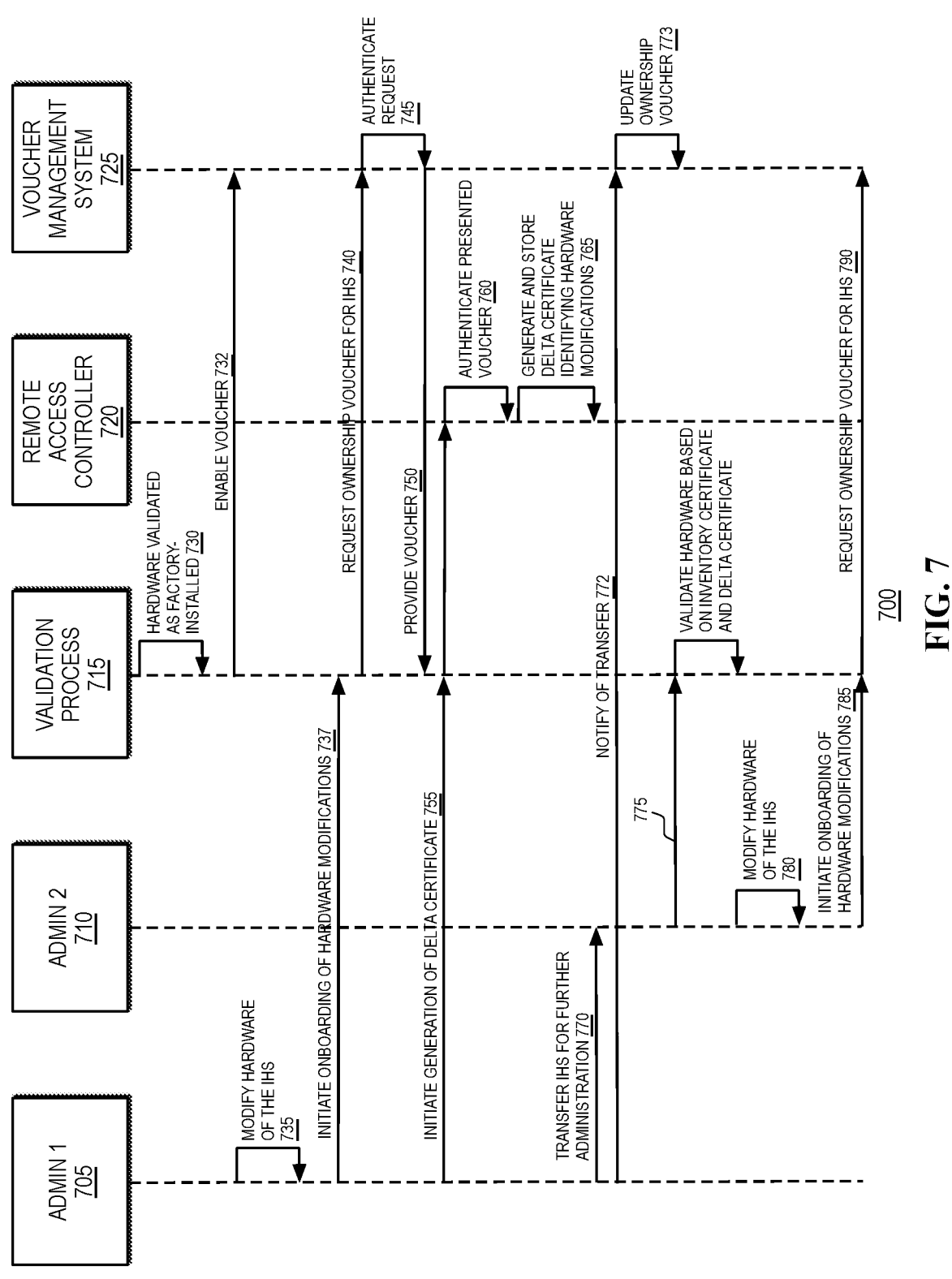
FIG. 7 is a swim lane diagram illustrating certain responsibilities of components of a system configured according to certain embodiments for securely modifying hardware components an IHS.

FIG. 7 is a swim lane diagram illustrating certain responsibilities of components of an IHS configured according to certain embodiments for securely modifying hardware components an IHS. In FIG. 7, embodiments may begin, at 730, with the successful initial validation of the detected hardware of the IHS as factory-installed. As described, this initial validation may occur upon an IHS that is factory-provisioned with an inventory certificate being received at a datacenter or other customer location and initialized for the first time by an administrator 705 that is preparing the IHS for deployment.

In certain embodiments, this initial validation of the hardware of the IHS as factory-installed is required in order for the validation process 715, such as the pre-boot validation process 510 of FIG. 5, to enable the ownership voucher that can then be used to establish ownership of the IHS in order to generate delta certificates that can be used to validate modification to the hardware of the IHS by the administrator 705. In this manner, modifications to the hardware of the IHS are supported, but only after establishing that the IHS has been received and initialized using only the factory-installed hardware. However, once the initial validation has been completed, at 732, the validation process 715 interfaces with the voucher management system 725 in order to enable the voucher for use in supporting modifications to the hardware of the IHS. As described with regard to FIG. 4A, during factory provisioning of an IHS, the ownership voucher is created for use in establishing authority to modify the IHS, where this voucher may specify the manufacturer of the IHS as the prior owner that previously had authority to modify the IHS and the designated administrator 705 as the current owner of the IHS with authority to modify the IHS. With this ownership voucher enabled, requests by the administrator 705 for access to the voucher are now supported by the voucher management system 725.

With the voucher enabled by the voucher management system 725, at 735, the administrator makes a modification to the hardware of the IHS. As described, these modifications by the administrator 705 may include removal, addition or replacement of one or more hardware components. For instance, an administrator may remove factory-installed memory modules 210a-n and replace them with specialized memory. In another illustrative example, the administrator may add a specialized graphics processor 235 for use in offloading artificial intelligence computations. In another example, the administrator may installed a specialized network controller that implements elevated security protocols or that enable high-speed data links with nearby IHSs.

Once the administrator 705 has completed these modifications, the IHS may be reassembled, powered and rebooted. As part of the initialization of the IHS, as indicated in FIG. 7, at 737, the administrator 705 may initiate onboarding of the hardware modifications. In some embodiments, this onboarding may be initiated by the administrator 705 in response to a notification that the procedures of FIGS. 5 and 6 resulted in a failure to validate the detected hardware against the inventory certificate, due to the modifications to the factory-installed hardware. For instance, a validation failure signaled, at block 690 of FIGS. 6B, may notify the administrator of the detected modifications to the factory-installed hardware of the IHS and may provide the administrator with an option for onboarding these modifications in a manner that will generate a delta certificate for use in validation these modifications as genuine changes to the factory-installed hardware of the IHS. In some embodiments, an administrator may be able to initiate onboarding of modifications directly through a boot mode selection, without having to attempt to validate the modified hardware of the IHS.

As indicated in FIG. 7, once the onboarding of hardware has been initiated, at 740, the validation process 715 makes a request to the voucher management system 725 for access to the ownership voucher of the IHS. As described with regard to FIG. 4A, factory provisioning of the IHS may include an ownership voucher being created for use in establishing and transferring ownership of the IHS, where ownership may not correspond to legal ownership but instead ownership with respect to authorization to make modifications to the hardware of the IHS. In embodiments, the ownership voucher for the IHS is generated by the factory provisioning process and uploaded to a voucher management system 725, where access to the ownership voucher may be restricted by the voucher management system 725 to users that present credentials that correspond to the identity of the current owner of the IHS, as specified by the ownership voucher for the IHS. In some embodiments, the voucher management system 725 may be compliant with or a variant of a FIDO ownership tracking system used in tracking ownership of devices from manufacturing through transfers between end users.

As indicated in FIG. 7, at 745, the voucher management system 725 authenticates the request by the administrator 705 for access to the ownership voucher. As described above, during factory-provisioning of the ownership voucher, the voucher may include an identity certificate, or other credentials, for use in authenticating the administrative user or entity that has been designated for receipt of the IHS, such as credentials for use in authenticating an designated administrator 705 of a data center to which the newly manufactured IHS is being shipped. Using such credentials included in the ownership voucher, the voucher management system 725, authenticates the request as originating from the entity for which the IHS has been factory-provisioned. If the request is successfully authenticated using the credentials factory-provisioned in the voucher, at 750, the voucher is provided to the validation process 715.

As described, delta certificates may be used to validate authorized modifications to the factory-installed hardware of the IHS. In embodiments, such delta certificates may be generated using the cryptographic capabilities of the remote access controller 720, as described with regard to the remote access controller 255 of FIG. 2. However, in embodiments, the remote access controller 720 may be configured to reject all requests to generate a delta certificate until the ownership voucher has been retrieved from the voucher management system 725. In this manner, delta certificate generation is precluded until the IHS has been validated to have been initially booted using only factory-installed hardware identified in the inventory certificate and the delta certificate requestor has been authenticated and been provided with the ownership voucher of the IHS by the voucher management system 725.

Accordingly, in order to generate the delta certificate for use in validating the hardware modifications made by administrator 705, at 755, a request is issued to the validation process 715 for generation of a delta certificate that identifies the hardware modifications made by the administrator 705. If the validation process 715 has not received the ownership voucher for the IHS from the voucher management system 725, the administrator 705 may be provided with a notification that a delta certificate cannot be generated until ownership of the IHS has been established through retrieval of the ownership voucher of the IHS. If the ownership voucher has been successfully retrieved from the voucher management system 725, at 760, the validation process 715 provides the voucher to the remote access controller 720 and issues a request for the generation of a delta certificate that specifies the hardware modifications made by the administrator 705.

As indicated in FIG. 7, the remote access controller 720 may authenticate the presented ownership voucher. As described, the ownership voucher includes both an identity certificate of the current owner and also includes the identity certificate of the prior owner. Accordingly, authentication of the presented ownership voucher may include validation of both of these identity certificates included in the voucher. In some embodiment, validation of a voucher may include validation of all identity certificates included in the ownership history recorded by the voucher. In some embodiments, the remote access controller 720 may present each of the identity certificates in the voucher to appropriate certificate authorities that can validate the authenticity of these certificates. For instance, when administrator 705 receives the IHS from the factory, the identity certificate in the voucher of the prior owner is an identity certificate that identifies the manufacturer of the IHS. In such instances, this identity certificate may be presented to a certificate authority that can validate the authenticity of this identity certificate as being bound to credentials controlled by the manufacturer of the IHS. In this same manner, the remote access controller 720 may present the current owner identity certificate to a certificate authority for validation that the administrator requesting the delta certificates has access to the credentials attested to by the identity certificate of the administrator 705 included in the ownership voucher as the identity of the current owner.

Once the identity certificates in the presented ownership voucher have been validated, at 765, the remote access controller 720 generates a delta certificate that identifies the hardware modifications made by the administrator 705. This delta certificate may thus specify unique identifiers for hardware components that have been added to the IHS by the administrator 705. This delta certificate also specifies the unique identifiers of hardware that may have been removed by the administrator 705. In some instances, the removed hardware may be factory-installed hardware that is identified in the original factory-provisioned inventory certificate of the IHS. As with the original inventory certificate, the remote access controller 720 may store the generated delta certificate to a protected memory device or other protected persistent data storage. With the delta certificate generated, the administrator 705 may be notified that the onboarding of the hardware modifications have been completed and a delta certificate for validating the authenticity of these modifications has been generated and stored. At this point, the IHS is ready for use, now using the hardware modifications made by the administrator 705.

In some instance, the IHS may be deployed for use in this configuration with the hardware modifications made by administrator 705. In such instances, validation of the hardware of the IHS may proceed according to the procedures of FIGS. 5 and 6, with any identified discrepancies from the factory-installed inventory evaluated for authenticity using the stored delta certificate. Whether prior to actual deployment or after the IHS has been deployed and is in use, in some instances, the hardware of the IHS may be further modified. As indicated in FIG. 7, at 770, the IHS may be transferred to administrator 710 for further modifications. As described, successive rounds of hardware modifications may be used in iteratively adapting the IHS for specific computing tasks.

Also as indicated in FIG. 7, at 772, the first designated administrator 705 notifies the voucher management system 725 of a transfer to a second designated administrator 710 that will now have authorization to modify the hardware of the IHS. In some embodiments, the first designated administrator 705 will provide the voucher management system 725 with an identity certificate, or other form of authentication, for the second designated administrator 710. In some embodiments, the identity certificate for the second designated administrator 710 may be provided to the voucher management system 725 by a separate system, such as based on inputs provided by the customer for which the IHS was manufactured and/or provisioned. Upon receipt of this notification and of the credentials for the second designated administrator 710, at 773, the voucher management system 725 updates the ownership voucher for the IHS such that the first designated administrator 705 is now identified as the more recent prior owner and the second designated administrator 710 is now the current owner of the IHS, with authorization to modify the IHS hardware.

In some embodiments, prior to administrator 710 being granted authority to make further modifications to the IHS using the ownership voucher, the current hardware inventory of the IHS is first validated. Accordingly, at 775, the second administrator 710 initializes the IHS in order to validate it has been received with only authentic hardware installed. Accordingly, the validation process 715 is launched and according the procedures of FIGS. 5 and 6, the original inventory certificate is used to validate the detected hardware of the IHS as including only factory-installed hardware. As described, identifiers collected from the detected hardware of the IHS are compared to the factory-installed hardware inventory specified in the original inventory certificate. Through these comparisons, embodiments detect the modifications made by the prior administrator 705 to the factory-installed hardware.

Upon detecting these discrepancies from the factory-installed hardware, the validation process 715 retrieves any delta certificates that have been generated and stored by the remote access controller 720. In this illustrated embodiment, the delta certificate generated, at 765, in response to the prior modifications by administrator 705 is retrieved from the remote access controller 720. The validation process 715 may first validate the authenticity of the delta certificate through interrogation of the remote access controller 720 and/or by a remote certificate authority. The hardware modifications described in the delta certificate are then compared to the discrepancies identified from the factory-installed hardware.

If the detected discrepancies are identified in a retrieved delta certificate, embodiments may provide notification to the second administrator 710 of the validation of the factory-installed hardware and the modification to the factory-installed hardware by the prior administrator 705. In scenarios where the identified discrepancies from the factory-installed hardware are not identified in any delta certificate, the validation process 715 may signal a validation failure to the administrator 710. In some embodiments, such a validation failure may also result in the validation process 715 notifying the voucher management system 725 in order to disable the voucher of the IHS, thus precluding further modifications to the IHS until the hardware discrepancy is resolved.

If the detected modifications are successfully authenticated by a delta certificate, at 780, the second administrator 710 may make additional modifications to the hardware of the IHS. For instance, the second administrator 710 may install specialized hardware that adapts the IHS for a particular computing task. For instance, the second administrator 710 may install an FPGA card 220 or other specially configured hardware accelerator that is programed to implement specific computational processing, such as an FPGA that has been programmed to implement training of a machine vision algorithm for use in artificial intelligence applications. In some instances, the modifications by the second administrator 710 may build on the prior modifications, such as through configuration of the added FPGA to utilize a PCIe network controller added by the prior administrator in order to retrieve data from a nearby IHS.

Once the second administrator 710 has completed these modifications, at 785, this administrator initiates onboarding of these modifications, where such onboarding may be initiated in the same manner as by the prior administrator 705, such as in response to a failure to validate the hardware modifications by the second administrator 710 using the inventory certificate and existing delta certificates. As with the initial modifications, upon receiving a request to onboard the hardware modifications, at 790, the validation process 715 requests the ownership voucher for the IHS from the voucher management system 725 in order to confirm the ownership of the IHS by the second administrator 710.

Figure 8:
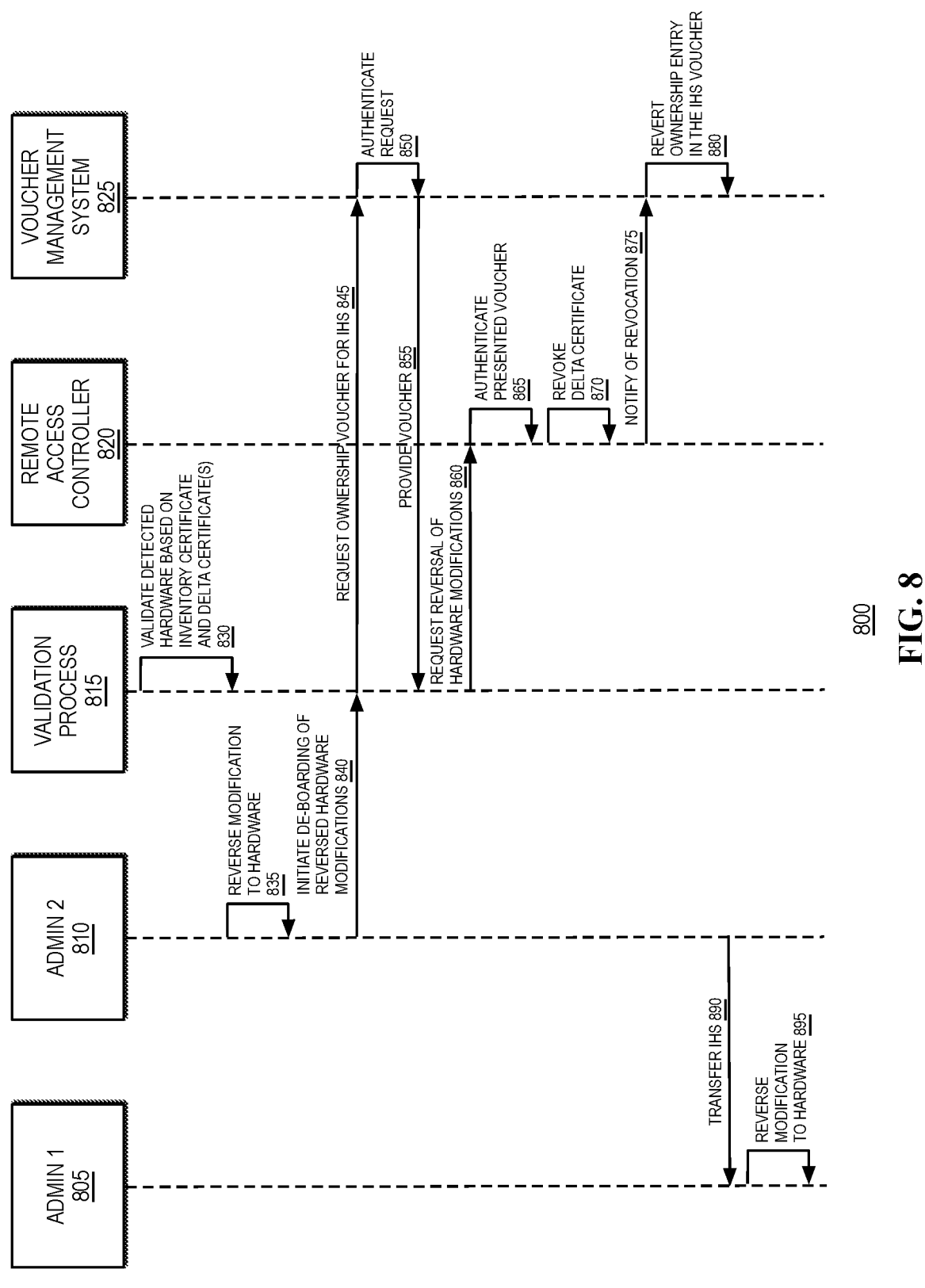
FIG. 8 is a swim lane diagram illustrating certain responsibilities of components of a system configured according to certain embodiments for secure reversal of modifications to hardware components an IHS.

FIG. 8 is a swim lane diagram illustrating certain responsibilities of components of an IHS configured according to certain embodiments for secure reversal of modifications to hardware components an IHS. In the embodiment of FIG. 8, the IHS has been factory-provisioned with an inventory certificate specifying the factory-installed hardware and authorized modifications by administrator 805 and administrator 810 are reflected in delta certificates generated by the remote access controller 820. In FIG. 8, a modification by administrator 810 is being reversed. For instance, hardware added to the IHS by administrator 810 is now being removed, and any hardware previously removed from the IHS is being replaced and re-installed to the IHS.

Embodiments may begin, at 830 with an initial validation of the detected hardware of the IHS as being factory-installed hardware, or authorized hardware modifications that are supported by a delta certificate. With the hardware of the IHS validated, at 835, the administrator 810 reverts a prior modification. For instance, in the above scenario, the administrator 810 may remove the specialized FPGA card from the IHS, where the reversal removes the specialized artificial intelligence training capabilities of the FPGA from the IHS, but does not reverse prior hardware modifications by the initial administrator 805. In this manner, the IHS may be reverted to a prior validated state, thus supporting immediate re-deployment of the IHS.

At 840, the administrator 810 reversing the hardware modifications may initiate deboarding of these modifications by the validation process 815. As with the described onboarding procedures, administrator 810 may be prompted to initiate deboarding of the hardware modifications in response to failed validation of the detected inventory against the inventory certificate and the available delta certificates. In other embodiments, the administrator 810 may initiate deboarding via a boot mode selection, without having to complete a validation that the administrator 810 is aware will fail due to the hardware modifications.

Once the deboarding procedure for the hardware reversal has been initiated, at 845, the validation process 815 request the ownership voucher of the IHS in order to revert the modifications by administrator 810. As during the onboarding procedures, at 850, the voucher management system 825 may validate the request based on credentials included in the voucher of the IHS. If the administrator 810 is authorized as the current owner of the IHS based on the current ownership identity certificate from the voucher of the IHS, at 855, the voucher is provided to the validation process 815 by the voucher management system 825.

As with the procedures for generating delta certificates in support of hardware modifications, embodiments may restrict revocation of delta certificates to administrators presenting the ownership voucher of the IHS. In this manner, both addition and revocation of identity certificates from the ownership voucher is restricted to scenarios where the voucher management system 825 confirms the requesting administrator as an authenticated owner of the IHS. At 860, the validation process 815 provides the voucher to the remote access controller 820 and requests reversal of the prior hardware modifications by administrator 810. As during the onboarding procedures, at 865, the remote access controller 820 may authenticate the presented voucher, such as through authentication of the identity certificate(s) include therein via queries to a certificate authority.

In scenarios where the presented voucher successfully authenticates the administrator 810 issuing the request for reversal of the hardware modification, at 870, the remote access controller 820 revokes the delta certificate that was generated for that particular hardware modification. In scenarios where administrator 810 will also relinquish ownership of the IHS, such as in placing the reverted IHS back into a pool of servers for more generalized use within a datacenter or to return the IHS to a prior owner, at 875, the remote access controller 820 notifies the voucher management system 825 of the reverted ownership of the IHS.

In response, at 880, the voucher management system 825 may remove the identity certificate of administrator 810 from the ownership voucher. The identity certificate of the prior owner of the IHS then becomes the identity certificate corresponding to the current owner of the IHS with authorization to make additional modifications to the hardware of the IHS. Once the ownership voucher for the IHS has been reverted, as indicated in FIG. 7, at 880, the administrator 810 transfers the IHS to the custody of the initial administrator 805. In some scenarios, the initial administrator 805 may transfer the IHS back to another administrator for further modifications to the hardware of the IHS in order to support its redeployment. In other scenarios, the initial administrator 805 may revert the initial modifications to the factory-installed hardware, such as to prepare the IHS for transfer to another entity or to return the IHS to the manufacturer.

In the same manner as the reversal by the second administrator 810, the reversal by the initial administrator 805 may be supported by the procedures of FIG. 8 by which the reversed modifications are deboarded, the corresponding delta certificate is revoked and the ownership voucher is reverted. In this manner, the initial administrator 805 may prepare the IHS to be returned to the manufacturer or other entity that is the legal owner of the IHS. In some scenarios, legal ownership of the IHS may remain with the manufacturer throughout these described procedures and the administrators 805, 810 making modifications to the factory-installed hardware are authorized by customers that lease the IHSs from the manufacturer or from another entity. In this manner, embodiments support reversible modifications to the factory-installed hardware of an IHS, where each modification can be separate validated and reversed.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) that comprises:
one or more processors;
a replay protected memory block (RPMB) coupled to the one or more processors, wherein the RPMB is configured to require all access commands to be digitally signed based at least in part on a symmetric key; and
one or more memory devices coupled to the one or more processors, the one or more memory devices configured with stored computer-readable instructions that, upon execution by the one or more processors, cause the IHS to execute a validation process that comprises:
retrieve a factory-provisioned inventory certificate that specifies factory-installed hardware of the IHS;
validate, based at least in part, on a private key of a cryptographic key pair generated by the IHS, that the factory-provisioned inventory certificate was generated within a hardware root of trust of the IHS, wherein the private key was encrypted with a hardware root key (HRK) of the IHS programmed into an immutable memory of the IHS when the IHS was factory-provisioned, wherein the encrypted private key was stored in the RPMB, and wherein the encrypted private key is retrievable from the RPMB to perform the validation only after the root of trust of the IHS has been successfully established;
retrieve, from a remote voucher management system, an ownership voucher of the IHS that specifies an identity of a first administrator designated as prior owner of the IHS and an identity of a second administrator designated as owner of the IHS, wherein the ownership voucher was uploaded to the remote voucher system when the IHS was factory-provisioned;
based on presentation of the retrieved ownership voucher of the IHS by the second administrator, obtain a delta certificate that specifies a hardware modification by the second administrator to the factory-installed hardware specified in the inventory certificate; and update the ownership voucher stored by the remote voucher system upon a transfer of the IHS to a third administrator, wherein the updated ownership voucher specifies the identity of the third administrator as the owner of the IHS and the identity of the second administrator as the prior owner of the IHS.

2. The IHS of claim 1, wherein an administrator designated as the owner of the IHS in the ownership voucher is authorized to modify hardware of the IHS.

3. The IHS of claim 1, wherein the validation process is further configured to block generation of delta certificates without retrieval of the ownership voucher from the remote voucher management system.

4. The IHS of claim 3, wherein the validation process is further configured to block generation of delta certificates without the second administrator confirmed as the owner of the IHS based on an identity certificate used as the identity of the owner in the ownership voucher.

5. The IHS of claim 1, wherein the factory-provisioned inventory certificate is stored to a persistent memory of the IHS when the IHS is factory-provisioned.

6. The IHS of claim 1, wherein the validation process is further configured to:

collect an inventory of detected hardware of the IHS; and validate the detected hardware of the IHS as factory-installed based on an inventory specified in the factory-provisioned inventory certificate.

7. The IHS of claim 1, wherein the delta certificate is obtained from a remote access controller of the IHS based on presentation of the retrieved ownership voucher.

8. The IHS of claim 1, wherein the remote voucher system comprises a Fast IDentity Online (FIDO) ownership tracking system.

9. The IHS of claim 1, wherein the ownership voucher of the IHS further comprises a digital signature of the factory-provisioned inventory certificate of the IHS.

10. The IHS of claim 9, wherein the ownership voucher of the IHS further comprises a digital signature of the delta certificate of the IHS that specifies a hardware modification by the second administrator.

11. A memory storage device configured with program instructions stored thereon that, upon execution by one or more processors of an Information Handling System (IHS) which comprises a replay protected memory block (RPMB) configured to require all access commands to be digitally signed using a symmetric key, cause the IHS to execute a validation process that comprises:

retrieve a factory-provisioned inventory certificate that specifies factory-installed hardware of the IHS;

decrypt, at least in part with a private key of a cryptographic key pair generated by the IHS, an encrypted signature associated with the factory-provisioned inventory certificate, wherein the private key was encrypted with a hardware root key (HRK) of the IHS programmed into an immutable memory of the IHS when the IHS was factory-provisioned, wherein the encrypted private key was stored in the RPMB, and wherein the encrypted private key is retrievable from the RPMB to perform a validation only after a root of trust of the IHS has been successfully established;

validate, based at least in part, on the decrypted signature, that the factory-provisioned inventory certificate was generated within the hardware root of trust of the IHS;

retrieve, from a remote voucher management system, an ownership voucher of the IHS that specifies an identity of a first administrator designated as prior owner of the IHS and an identity of a second administrator designated as owner of the IHS, wherein the ownership voucher is uploaded to the remote voucher system when the IHS is factory-provisioned;

based on presentation of the retrieved ownership voucher of the IHS by the second administrator, obtain a delta certificate that specifies a hardware modification by the second administrator to the factory-installed hardware specified in the inventory certificate; and update the ownership voucher stored by the remote voucher system upon a transfer of the IHS to a third administrator, wherein the updated ownership voucher specifies the identity of the third administrator as the owner of the IHS and the identity of the second administrator as the prior owner of the HIS.

12. The memory storage device of claim 11, wherein an administrator designated as the owner of the IHS in the ownership voucher is authorized to modify hardware of the IHS.

13. The memory storage device of claim 11, wherein the validation process is further configured to block generation of delta certificates without retrieval of the ownership voucher from the remote voucher management system.

14. The memory storage device of claim 13, wherein the validation process is further configured to block generation of delta certificates without the second administrator confirmed as the owner of the IHS based on an identity certificate used as the identity of the owner in the ownership voucher.

15. The memory storage device of claim 11, wherein the factory-provisioned inventory certificate is stored to a persistent memory of the IHS when the IHS is factory-provisioned.

16. A method for managing modifications to an Information Handling System (IHS) comprising a replay protected memory block (RPMB) requiring all access commands to be digitally signed using a symmetric key, the method comprising:

retrieving a factory-provisioned inventory certificate that specifies factory-installed hardware of the IHS;

decrypting, at least in part with a factory-provisioned hardware root key (HRK) of the IHS, an encrypted private key of a cryptographic key pair generated by the IHS;

decrypting, at least in part with the decrypted private key, an encrypted signature associated with the factory-provisioned inventory certificate, wherein the private key was encrypted using the HRK programmed into an immutable memory of the IHS when the IHS was factory-provisioned, wherein the encrypted private key was stored in the RPMB, and wherein the encrypted private key is retrievable from the RPMB to perform a validation only after a root of trust of the IHS has been successfully established;

validating, based at least in part, on the decrypted signature, that the factory-provisioned inventory certificate was generated within the hardware root of trust of the IHS;

retrieving, from a remote voucher management system, an ownership voucher of the IHS that specifies an identity of a first administrator designated as prior owner of the IHS and an identity of a second administrator designated as owner of the IHS, wherein the ownership voucher is uploaded to the remote voucher system as part of factory provisioning of the IHS;

based on presentation of the retrieved ownership voucher of the IHS by the second administrator, obtaining a delta certificate that specifies a hardware modification by the second administrator to the factory-installed hardware specified in the inventory certificate; and updating the ownership voucher stored by the remote voucher system upon a transfer of the IHS to a third administrator, wherein the updated ownership voucher specifies the identity of the third administrator as the owner of the IHS and the identity of the second administrator as the prior owner of the IHS.

17. The method of claim 16, wherein an administrator designated as the owner of the IHS in the ownership voucher is authorized to modify hardware of the IHS.

18. The method of claim 16, wherein the method further comprises blocking generation of delta certificates without retrieval of the ownership voucher from the remote voucher management system.

19. The method of claim 18, wherein the method further comprises blocking generation of delta certificates without the second administrator confirmed as the owner of the IHS based on an identity certificate used as the identity of the owner in the ownership voucher.

20. The method of claim 16, wherein the method further comprises storing the factory-provisioned inventory certificate to a persistent memory of the IHS during the factory-provisioning of the IHS.

* * * * *